US 8,004,112 B2

(12) United States Patent
Koga et al.

(10) Patent No.: US 8,004,112 B2
(45) Date of Patent: Aug. 23, 2011

(54) COMMUNICATION APPARATUS, COMMUNICATION SYSTEM, IMAGE CAPTURE APPARATUS, VIDEO CAPTURE APPARATUS, AND SETTING METHOD THEREOF

(75) Inventors: Hisao Koga, Fukuoka (JP); Nobutaka Kodama, Fukuoka (JP); Yasushi Yokomitsu, Fukuoka (JP); Mutsuhiko Ooishi, Fukuoka (JP)

(73) Assignee: Panasonic Corporation, Osaka (JP)

( * ) Notice: Subject to any disclaimer, the term of this patent is extended or adjusted under 35 U.S.C. 154(b) by 1315 days.

(21) Appl. No.: 11/520,046

(22) Filed: Sep. 13, 2006

(65) Prior Publication Data

US 2007/0120953 A1  May 31, 2007

(30) Foreign Application Priority Data

Sep. 15, 2005  (JP) .............................. P. 2005-268108
Jun. 22, 2006  (JP) .............................. P. 2006-172549

(51) Int. Cl.
*H04B 3/54* (2006.01)
*H02J 3/00* (2006.01)

(52) U.S. Cl. ........................ 307/36; 307/1; 307/3; 307/4
(58) Field of Classification Search .................. 307/1, 3, 307/4, 36
See application file for complete search history.

(56) References Cited

U.S. PATENT DOCUMENTS

| 7,755,503 | B2 * | 7/2010 | Bonorden et al. ......... 340/686.1 |
| 2003/0043028 | A1 | 3/2003 | Torikai et al. |
| 2004/0125870 | A1 | 7/2004 | Yamazaki |
| 2005/0132193 | A1 | 6/2005 | Ishidoshiro et al. |

FOREIGN PATENT DOCUMENTS

| EP | 1195941 | 4/2002 |
| JP | 2000165304 | 6/2000 |
| JP | 2000-244376 | 9/2000 |
| JP | 2005175524 | 6/2005 |

OTHER PUBLICATIONS

PCT International Search Report dated Feb. 2, 2007.
Japanese Notification for Reasons for Refusal dated Jan. 25, 2011 with Partial English translation.
Japanese Office Action dated Apr. 26, 2011.

* cited by examiner

*Primary Examiner* — Jared J Fureman
*Assistant Examiner* — Hal I Kaplan
(74) *Attorney, Agent, or Firm* — Dickinson Wright PLLC

(57) ABSTRACT

A communication apparatus has a electrical outlet that is electrically connected to a power connector so as to supply power externally; a connection detector that detects connection of an external plug to the electrical outlet; and a controller that uses a receiver and a transmitter so as to perform setting with a device connected to the electrical outlet, when external connection is detected at the electrical outlet.

20 Claims, 21 Drawing Sheets

FIG. 8A   FIG. 8B   FIG. 8C
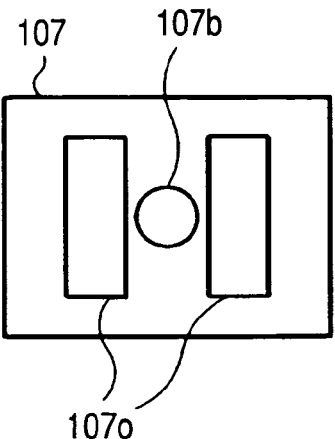
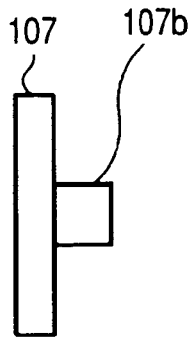
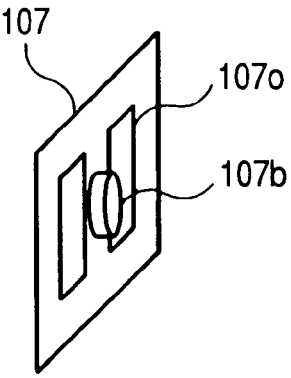
FIG. 9
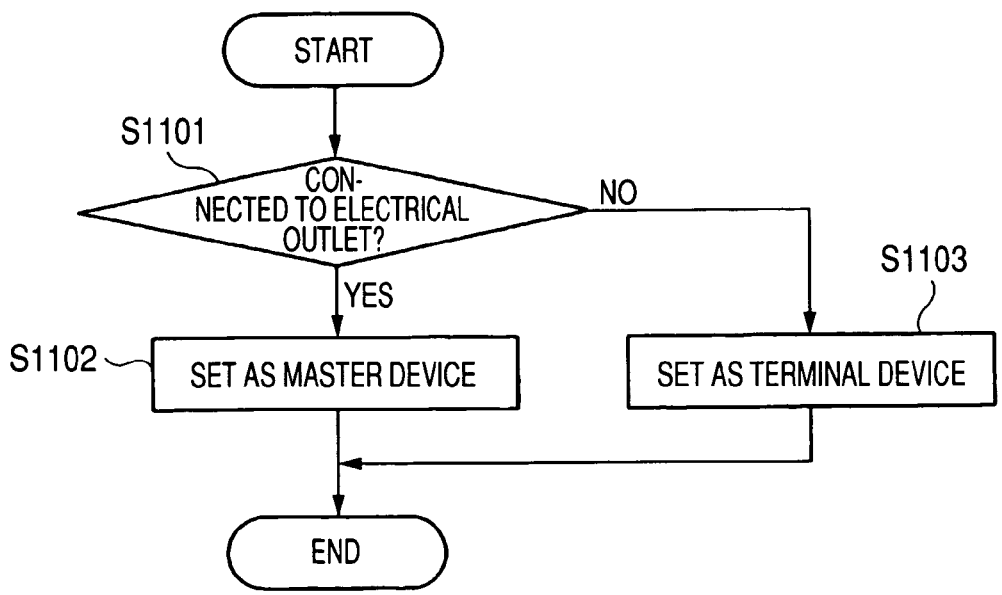

COMMUNICATION APPARATUS, COMMUNICATION SYSTEM, IMAGE CAPTURE APPARATUS, VIDEO CAPTURE APPARATUS, AND SETTING METHOD THEREOF

BACKGROUND

1. Field of the Invention

The present invention relates to a communication apparatus, a communication system, an image capture apparatus, a video capture apparatus, and a setting method thereof.

2. Description of Related Art

To perform wired data communication at home, office, or factory using a terminal, such as a computer, for example, it is normally required to install wiring for cables and connectors used as transmission lines at required locations. A variety of installation works are thus required before starting operation of communication equipment.

Meanwhile, a commercial power source, which is, for example, an AC power of 120 V (60 Hz) in the U.S. or 100 V (50/60 Hz) in Japan, is mostly used at home, office, factory, and the like. Thus, power lines that supply the power are already installed across home, office, factory, and the like. Using the power lines for data communication would eliminate additional installation of wiring exclusively for communication use. That is, simply plugging a communication apparatus into a power outlet allows deployment of a communication path.

As power line communication (PLC) technology for communication using a power line, a technology as disclosed in Japanese Patent Laid-open Publication 2000-165304 is known, for example.

Further, in wireless LAN, an encryption key setting method that enables simple registration of a terminal to a network is disclosed in, for example, U.S. Patent Publication 2005-132193A1. The encryption key setting method performs encryption key setting with a single press of a registration button provided on each of an access point, which is a relay apparatus for wireless LAN, and the terminal.

When newly connecting a communication apparatus to a network of the above-described power line communication system and the like, it is required to perform settings, including registration to the network, security authentication, and the like. However, the setting method described in U.S. Patent Publication 2005-132193A1 requires a user to know in advance that the settings are necessary and to press the button on each of the access point and the terminal, thus resulting in cumbersome procedures.

SUMMARY

Embodiments explained below are provided to address the above-described shortcomings. An object of the embodiments is to provide a communication apparatus, a communication system, an image capture apparatus, a video capture apparatus, and a setting method thereof that allow easy setting between communication apparatuses while requiring no user attention thereto.

The communication apparatus described in the embodiments communicates with another communication apparatus. The communication apparatus includes: an electrical inlet for obtaining power, an electrical outlet for outputting the power, and an integrated circuit for performing negotiation between the communication apparatus and the another communication apparatus, wherein when the electrical outlet is connected to the another communication apparatus, the electrical outlet outputs the power to the another communication apparatus and the integrated circuit performs the negotiation with the another communication apparatus via the electrical outlet.

In the configuration above, connecting the another communication apparatus to the electrical outlet automatically performs the negotiation, and thus allows easy setting.

The communication system includes: a first communication apparatus that has a first electrical inlet for obtaining power, a first electrical outlet for outputting the power, and a first integrated circuit for performing negotiation; and a second communication apparatus that has a second electrical inlet for obtaining the power, and a second integrated circuit for performing the negotiation; wherein when the first electrical outlet is connected to the second electrical inlet, the first electrical outlet outputs the power to the second electrical inlet and the first integrated circuit and the second integrated circuit perform the negotiation between the first communication apparatus and the second communication apparatus via the first electrical outlet and the second electrical inlet, and wherein the second integrated circuit decreases transmitting output strength during the negotiation.

The image capture apparatus described in the embodiments communicates with another communication apparatus. The image capture apparatus includes: an electrical inlet for obtaining AC power; an electrical outlet for outputting the AC power; an integrated circuit for performing negotiation between the image capture apparatus and the another communication apparatus; an image capture unit for capturing image data via the integrated circuit, the image data being output from an image output apparatus connected via the electrical outlet; and a filter for connecting a path connecting the power outlet and the integrated circuit and the electrical inlet, and for attenuating a signal in a frequency band excluding at least a frequency of the AC power, wherein when the electrical outlet is connected to the another communication apparatus, the electrical outlet outputs the AC power to the another communication apparatus, and the integrated circuit performs the negotiation with the another communication apparatus via the electrical outlet.

In the configuration above, connecting the image output apparatus to the power outlet allows easy setting for power line communication. Further, the filter keeps a power line communication signal from flowing to the power input unit, thus enabling high-volume communication with the image output apparatus, without impacting a power line communication network connected via the power input unit.

The setting method described in the embodiments is a method for performing negotiation between a communication apparatus and another communication apparatus, the communication apparatus having an electrical inlet and an electrical outlet. The method includes: inputting power to the electrical inlet; outputting the power from the electrical outlet; and performing the negotiation between the communication apparatus and another communication apparatus; wherein when the electrical outlet is connected to the another communication apparatus, the power is output to the another communication apparatus, and the negotiation is performed via the electrical outlet.

In the method above, inserting a plug into a power outlet automatically executes the setting process, and thus allows easy setting.

BRIEF DESCRIPTION OF THE DRAWINGS

FIGS. 8A, 8B, and 8C are external views of a electrical outlet according to the first embodiment;

FIG. 9 is a flowchart illustrating a setting procedure on the communication apparatus according to the first embodiment;

DETAILED DESCRIPTION

A communication apparatus according to the embodiments is explained below with reference to FIGS. 1 to 24. Described as an example of the communication apparatus is a communication apparatus that performs wideband communication (2 to 30 MHz) in a multi-carrier communication system using a power line as a transmission line.

First, an overview is provided of the communication apparatus according to the embodiments. As an example of the communication apparatus, a PLC (Power Line Communication) modem, which is one of the power line communication apparatuses, is used in the embodiments.

Figure 1:
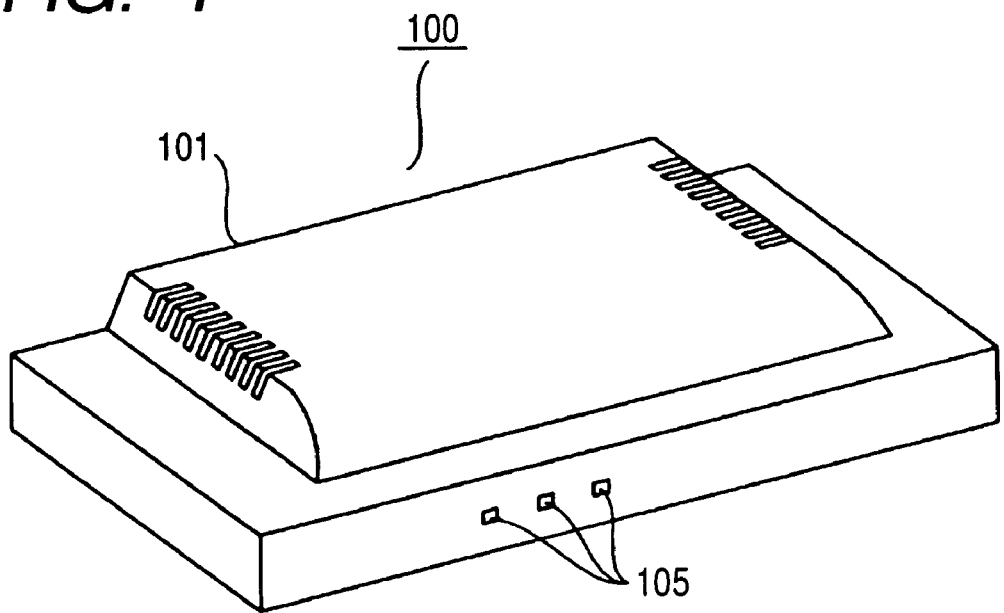
FIG. 1 is an external perspective view of a front side of a communication apparatus according to embodiments.
Figure 2:
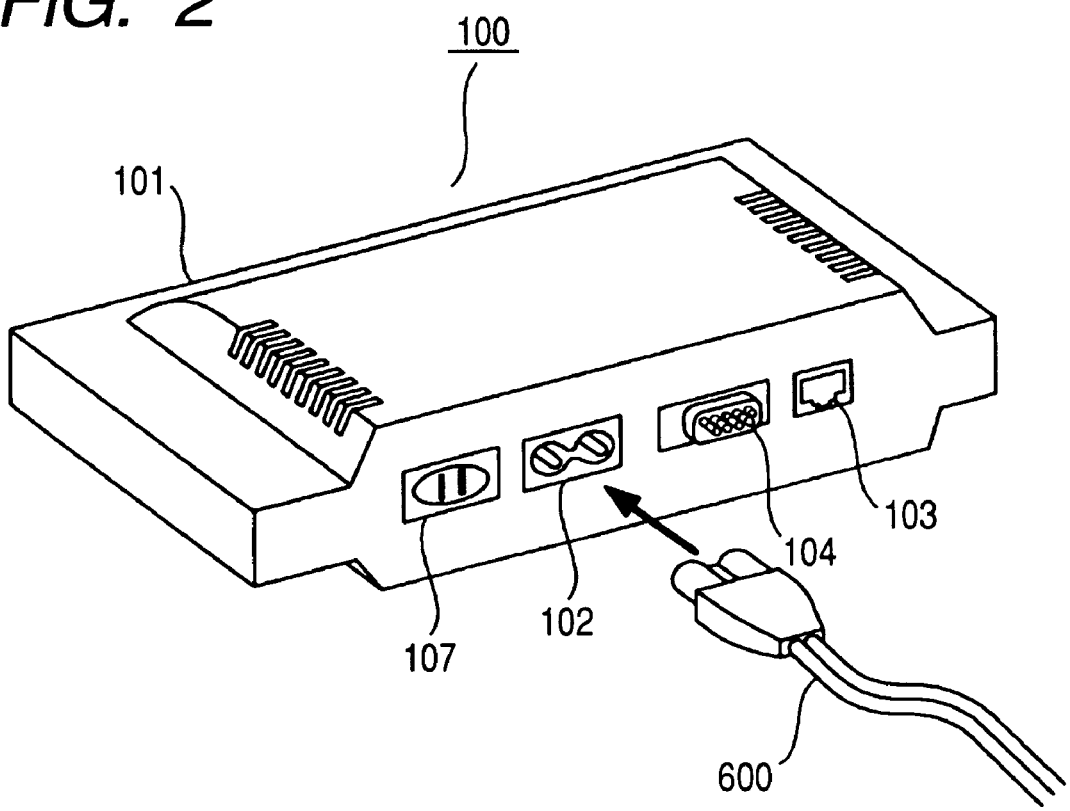
FIG. 2 is an external perspective view of a rear side of the communication apparatus according to the embodiments.

Communication apparatus 100 shown in FIGS. 1 and 2 has chassis 101. Provided on a front side of chassis 101 is display 105 that has LEDs (Light Emitting Diodes) and the like as shown in FIG. 1. Provided on a rear side of chassis 101 are, as shown in FIG. 2, power connector 102; modular jack 103 for LAN (Local Area Network), such as RJ-45 and the like; D-sub (D-subminiature) connector 104; and electrical outlet 107.

Power connector 102 operates as an example of an electrical inlet, to which power, including AC (Alternating Current) power and the like, is input as being transferred on the power line. Power connector 102 obtains AC (Alternating Current) power. Power cable 600 is connected to power connector 102. A LAN cable (not shown in the drawing) is connected to modular jack 103. A D-sub cable (not shown in the drawing) is connected to D-sub connector 104. Electrical outlet 107 operates as an example of a power outlet (a power output unit), which is electrically connected to power connecter 102 and externally outputs power.

Although AC power is used as a power source in the explanation below, the power source may be DC power instead. AC power includes, for example, commercial power whose voltage and frequency vary (e.g., 120 V, 60 Hz in the U.S.; 100 V, 50/60 Hz in Japan). Further, AC power does not need to be commercial power.

Figure 3:
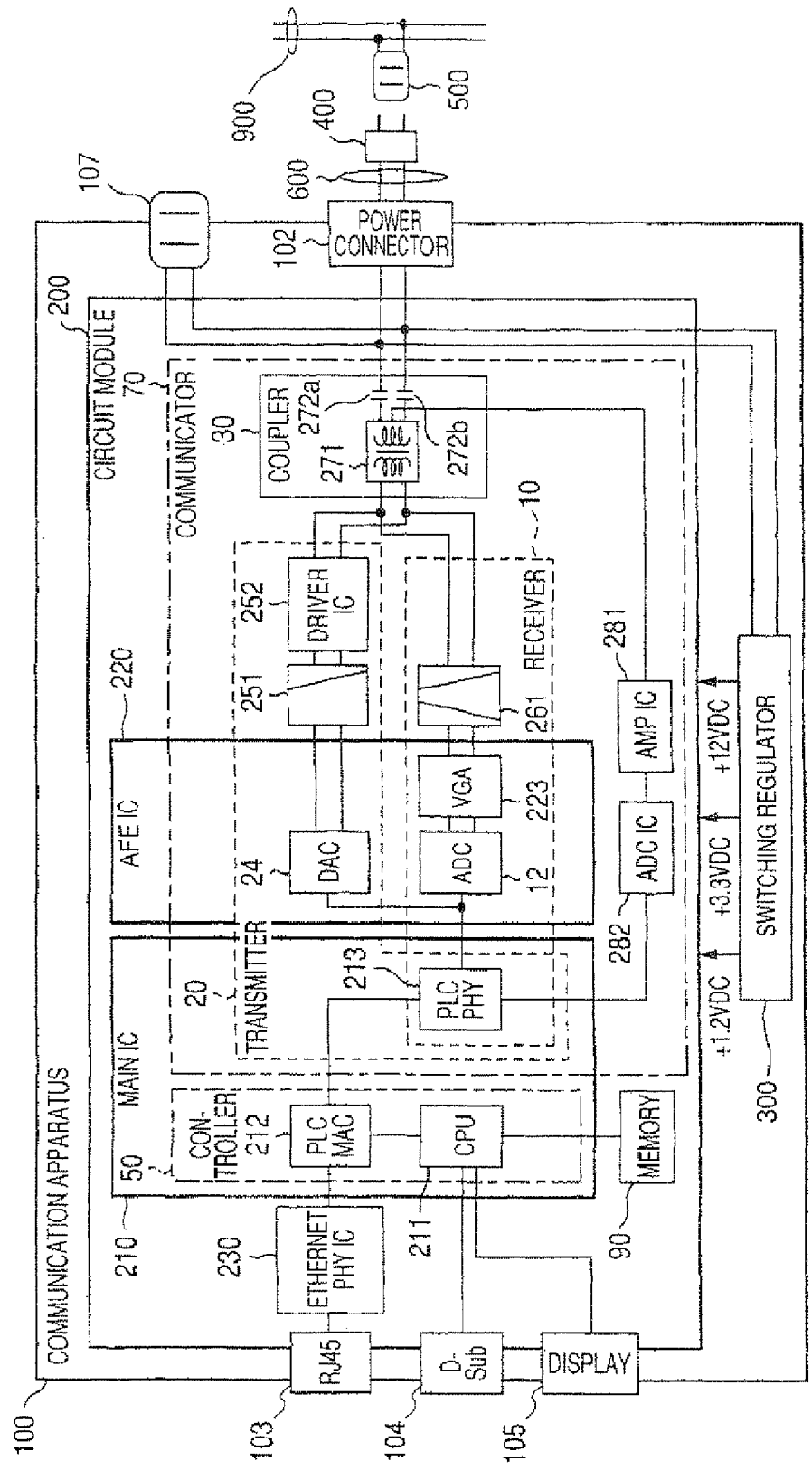
FIG. 3 is a block diagram illustrating an example of a basic hardware configuration of the communication apparatus according to the embodiments.

As shown in FIG. 3, communication apparatus 100 has circuit module 200 and switching regulator 300 (hereinafter referred to as a power unit). Power unit 300 supplies a variety of voltages (e.g., +1.2 V, +3.3 V, and +12V) to circuit module 200. Power unit 300 includes, for example, a line filter, a switching transformer, and a DC-to-DC converter (none are shown in the drawing).

Circuit module 200 includes main IC (Integrated Circuit) 210, AFE IC (Analog Front End IC) 220, Ethernet PHY IC (Physical Layer Integrated Circuit) 230, memory 90, low pass filter (LPF) 251, driver IC 252, band pass filter (BPF) 261, AMP (amplifier) IC 281, ADC (AD conversion) IC 282, and coupler 30. Power unit 300 and coupler 30 are connected to power connector 102, and further connected to power line 900 via power cable 600, plug 400, and outlet 500. In addition, power unit 300, coupler 30, and power connector 102 are connected to electrical outlet 107. Plug 400 operates as an example of the electrical inlet.

Main IC 210 includes CPU (Central Processing Unit) 211, PLC MAC (Power Line Communication Media Access Control layer) block 212, and PLC PHY (Power Line Communication Physical layer) block 213. CPU 211 is installed with a 32-bit RISC (Reduced Instruction Set Computer) processor. CPU 211 functions as a setting controller that performs setting of another communication apparatus connected to electrical outlet 107. PLC MAC block 212 controls a MAC layer (Media Access Control layer) of a transmitted signal; PLC PHY block 213 controls a PHY layer (Physical layer) of a transmitted signal.

In the present embodiments, a "negotiation" indicates a process in which information required for communication between communication apparatuses is exchanged between the communication apparatuses. The required information includes identification data and encryption key data. The identification data are information that uniquely identifies a communication apparatus on a network (e.g., a PLC network), including a MAC address and a local IP address. The encryption key data are information for generating a unique key, including, for example, an encryption algorithm for the unique key and a unique key seed. The negotiation also includes a process to register a terminal device. The process to register the terminal device means, when a communication apparatus that controls a network (a master device) and a communication apparatus that performs communication under control of the master device (a terminal device) are set on the network, a process to store identification data of the terminal device in memory of the master device.

AFE IC 220 includes D/A converter (DAC) 24, A/D converter (ADC) 12, and variable gain amplifier (VGA) 223.

Coupler 30 includes coil transformer 271 and coupling capacitors 272*a* and 272*b*.

Using data and a control program stored in memory 90, CPU 211 controls operations of PLC MAC block 212 and PLC PHY block 213, and at the same time controls an entirety of communication apparatus 100.

Communication apparatus 100 performs multi-carrier communication that uses a plurality of sub-carriers, such as an OFDM (Orthogonal Frequency Division Multiplexing) system and the like. Digital signal processing for the transmission is performed in main IC 210, particularly in PLC PHY block 213.

PLC PHY block 213, ADC 12, VGA 223, and BPF 261 function as receiver 10. PLC PHY block 213, DAC 24, LPF 251, and driver IC 252 function as transmitter 20. CPU 211 and PLC MAC block 212 function as controller 50. Further, receiver 10, transmitter 20, and coupler 30 function as communicator 70.

Communication apparatus 100 of the present embodiments that has the above-described configuration performs setting of a communication apparatus capable of performing power line communication when the communication apparatus is connected via electrical outlet 107. Thus, inserting a plug of the communication apparatus for setting into electrical outlet 107 automatically performs the negotiation, and thereby allows easy setting.

The present embodiments explain a case where communication apparatus 100 is applied to a power line communication system that includes a master device and a terminal device. The master device controls communication in the power line communication system, whereas the terminal device performs power line communication under control of the master device. Further, the terminal device is a communication apparatus that is connected to electrical outlet 107 of communication apparatus 100 and for which setting is performed. A process to register the terminal device with the master device so as to allow the terminal device to connect to the communication system is explained as an example of the negotiation. To distinguish the master and terminal devices in the explanation below, "M" for the master device or "T" for the terminal device is suffixed to a numerical reference given to each component.

Figure 4:
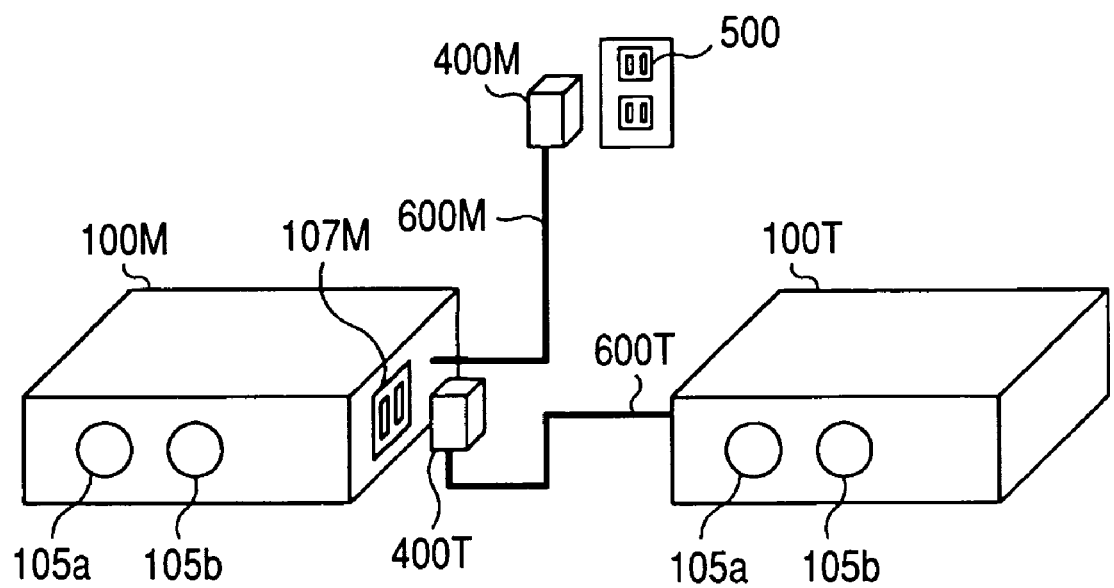
FIG. 4 illustrates the communication apparatus according to the embodiments during a negotiation.

Explained below with reference to FIG. 4 is a case where setting is performed between communication apparatus 100M that operates as a master device (hereinafter referred to as a master device) and communication apparatus 100T that operates as a terminal device (hereinafter referred to as a terminal device). Master device 100M and terminal device 100T have a configuration similar to communication apparatus 100 shown in FIGS. 1 to 3. However, terminal device 100T does not need to have electrical outlet 107.

Master device 100M is connectable to power line 900 via power cable 600M connected to plug 400M. Plug 400M operates as an example of the electrical inlet. Terminal device 100T is connectable to outlet 500 via power cable 600T connected to plug 400T. Further, communication apparatuses 100M and 100T have displays 105*a* and 105*b* formed of two LEDs (Light Emitting Diodes) as an example of display 105. Display 105*a*, which functions as an example of a setting display, indicates that a communication apparatus therewith is set as a master device or a terminal device by lighting when set as the master device, for example. Display 105*b* indicates that setting via the electrical outlet is being performed by flashing during the negotiation, for example.

Plug 400M connected to master device 100M is inserted into outlet 500, which is, for example, a wall outlet and the like provided on a wall surface and the like. Inserting plug 400M into outlet 500 supplies power to master device 100M and allows the power to be supplied from electrical outlet 107M to an external device.

When plug 400T connected to terminal device 100T is connected to electrical outlet 107M of master device 100M, communication apparatuses 100M and 100T start performing a variety of settings for each other, including registration, security authentication, and the like. In other words, connecting terminal device 100T to electrical outlet 107M of master device 100M automatically initiates the negotiation, and thus allows easy setting.

Figure 5:
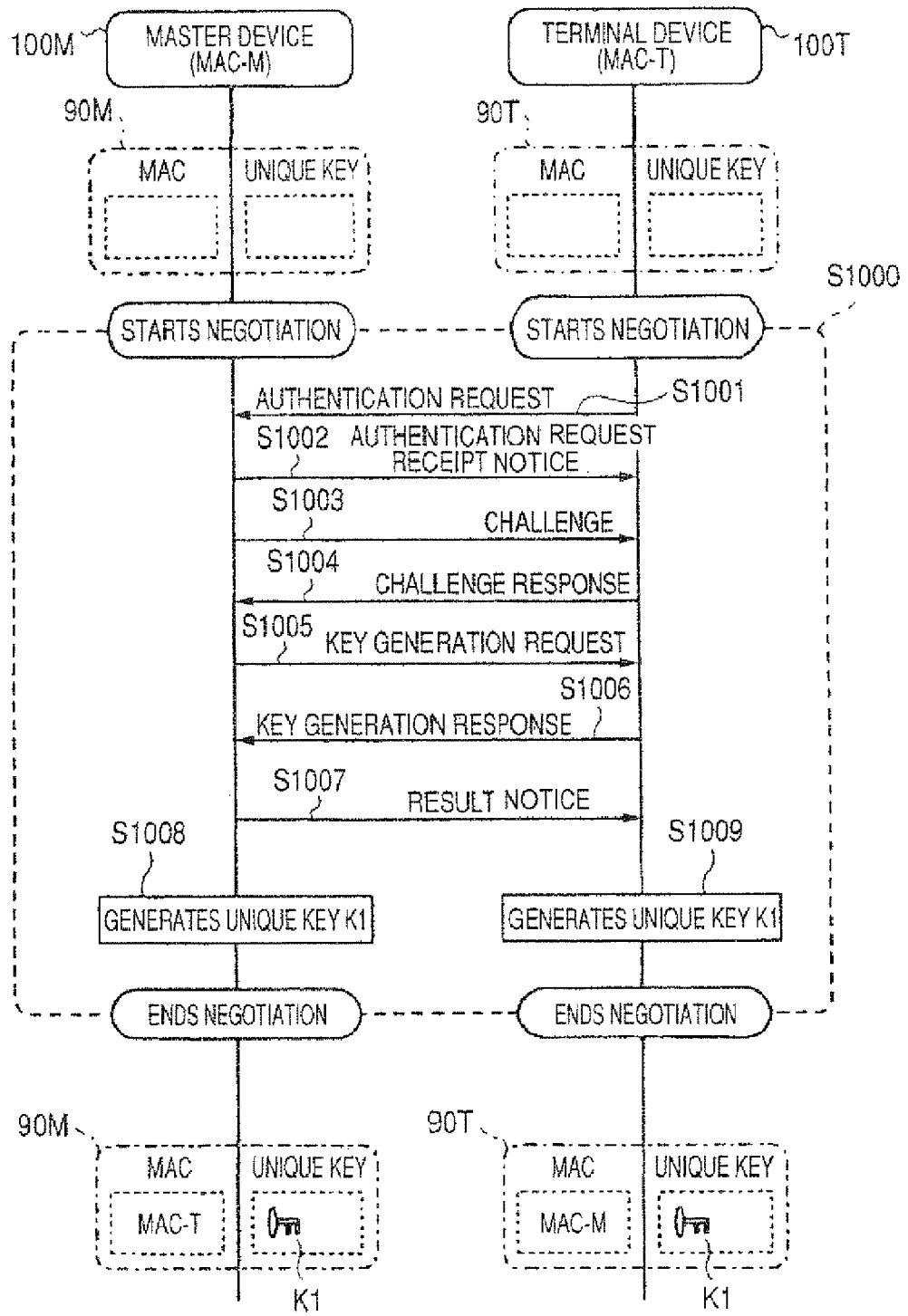
FIG. 5 is a sequence diagram illustrating a setting procedure of a setting method on the communication apparatus according to the embodiments.

As shown in FIG. 5, MAC-M indicates a MAC address (Media Access Control Address), which is an example of unique identification data, assigned to master device 100M; and MAC-T indicates a MAC address assigned to terminal device 100T. Each of memory 90M of master device 100M and memory 90T of terminal device 100T has an area that stores a MAC address and a unique key of a communication apparatus capable of performing communication. In this example, master device 100M and terminal device 100T have a common key for the negotiation stored in memory 90M and 90T respectively.

When the negotiation starts, terminal device 100T issues an authentication request to master device 100M (step S1001). When receiving the authentication request from terminal device 100T, master device 100M transmits to terminal device 100T an authentication request receipt notice that notifies receipt of the authentication request (step S1002).

Then, master device 100M generates and transmits a random number to terminal device 100T as challenge data (step S1003). Based on the received challenge data and the common key, terminal device 100T generates and transmits challenge response data to master device 100M (step S1004).

Master device 100M compares the challenge response data received in step S1004 with data derived from the random number generated from the common key. When the data are identical, master device 100M authenticates terminal device 100T as a proper communication apparatus.

When completing authentication, master device 100M transmits to terminal device 100T a key generation request that requests generation of a unique key (step S1005). In response to the key generation request, terminal device 100T transmits a key generation response to master device 100M (step S1006), which then issues a result notice (step S1007). Then, master device 100M and terminal device 100T generate unique key K1, which is unique encryption key data between master device 100M and terminal device 100T, and complete the negotiation.

As a result of the process, memory 90M of master device 100M stores MAC-T, which is a MAC address of terminal device 100T, and unique key K1. Memory 90T of terminal device 100T stores MAC-M, which is a MAC address of master device 100M, and unique key K1. Thereby, both master device 100M and terminal device 100T are capable of communicating using the identification data of each other (MAC addresses) and unique key K1. The above-described negotiation (steps S1001 to S1009) is performed on CPUs 212M and 212T in controllers 50M and 50T of master device 100M and terminal device 100T respectively.

The explanation above describes power connector 102, to which AC power transferred on the power line is input, as an example of the electrical inlet. The power source is not limited to AC power transferred on the power line, but may be DC power, which is input from an AC adapter, a rechargeable battery, or the like. The electrical inlet only needs to have a configuration capable of receiving the power. Further, electrical outlet 107 is described as an example of the power output unit. However, the power output unit is not limited to electrical outlet 107. The power output unit only needs to have a configuration capable of externally outputting the power input to the electrical inlet.

Provided below are explanations on first to seventh embodiments with reference to the drawings.

First Embodiment

Figure 6:
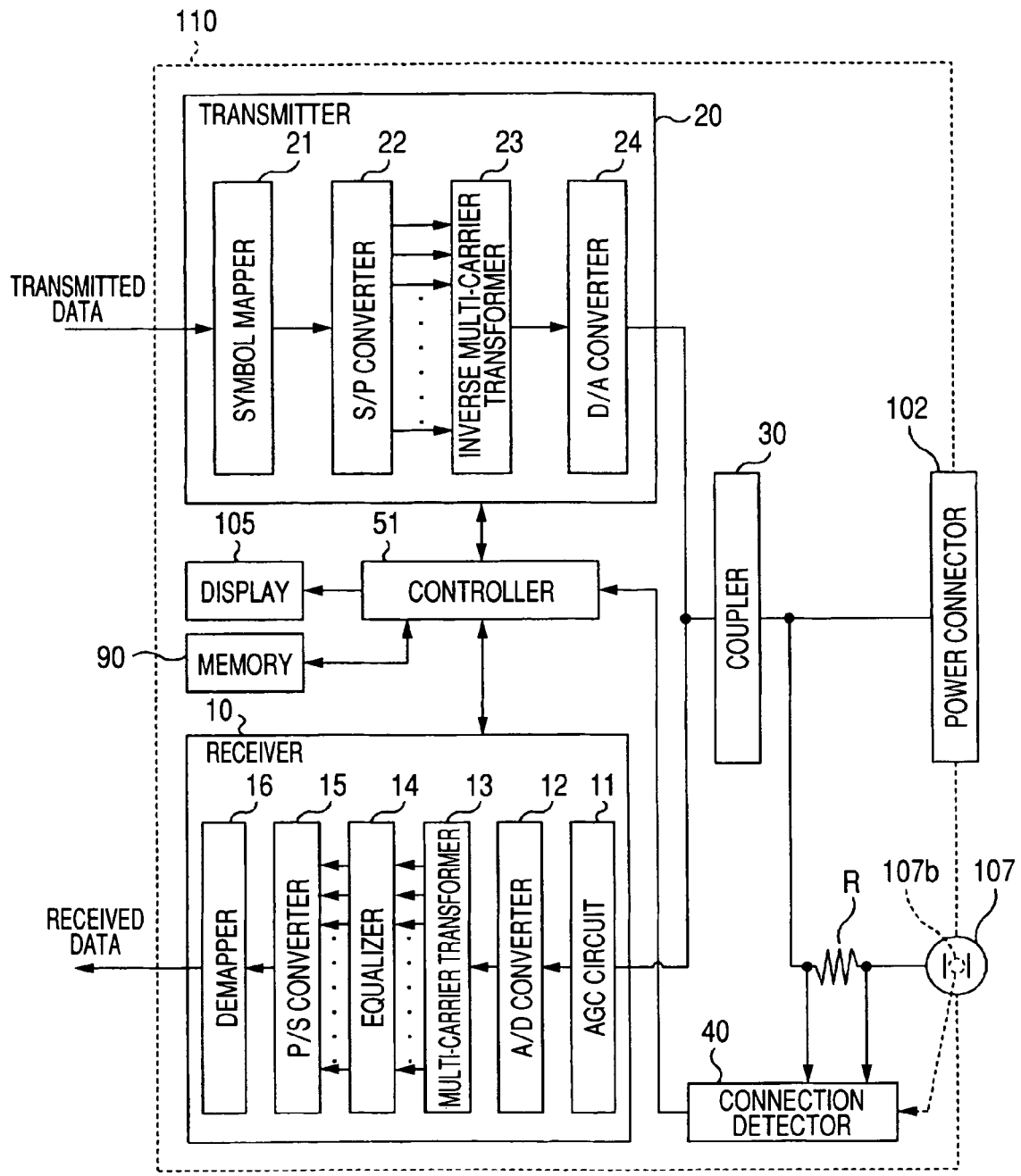
FIG. 6 is a block diagram illustrating a general configuration of a communication apparatus according to a first embodiment.

In FIG. 6, components identical to those in FIG. 3 are provided with identical reference numbers. As shown in FIG. 6, communication apparatus 110 according to a first embodiment has receiver 10, transmitter 20, coupler 30, connection detector 40, controller 51, display 105, and memory 90. Further, communication apparatus 110 includes power connector 102 that functions as an example of the electrical inlet to which power is input and that connects to commercial AC power; and electrical outlet 107 that is electrically connected to power connector 102 and that externally outputs power.

Receiver 10 has auto gain control circuit (AGC circuit) 11 that functions as an example of an auto gain controller; A/D converter 12; multi-carrier transformer 13 that performs desired time-to-frequency transform, such as a Fourier transformer (FFT), a wavelet transformer (DWT), and the like; equalizer 14 that corrects a received signal so as to cancel an effect of a transmission line; P/S converter 15 that converts parallel data into serial data; and demapper 16 that converts mapped symbol data to bit data, which are a received signal.

Transmitter 20 has symbol mapper 21 that performs symbol mapping by converting bit data, which are a transmitted signal, into symbol data; S/P converter 22 that converts serial data into parallel data; inverse multi-carrier transformer 23 that performs desired frequency-to-time transform, such as an inverse Fourier transformer (IFFT), an inverse wavelet transformer (IDWT), and the like; and D/A converter 24.

Coupler 30 superimposes a signal from transmitter 20 as a power line communication signal to a power line (not shown in the drawing) via power connector 102. Coupler 30 also extracts only a power line communication signal from the power line and transmits the power line communication signal to receiver 10.

Figure 7A:
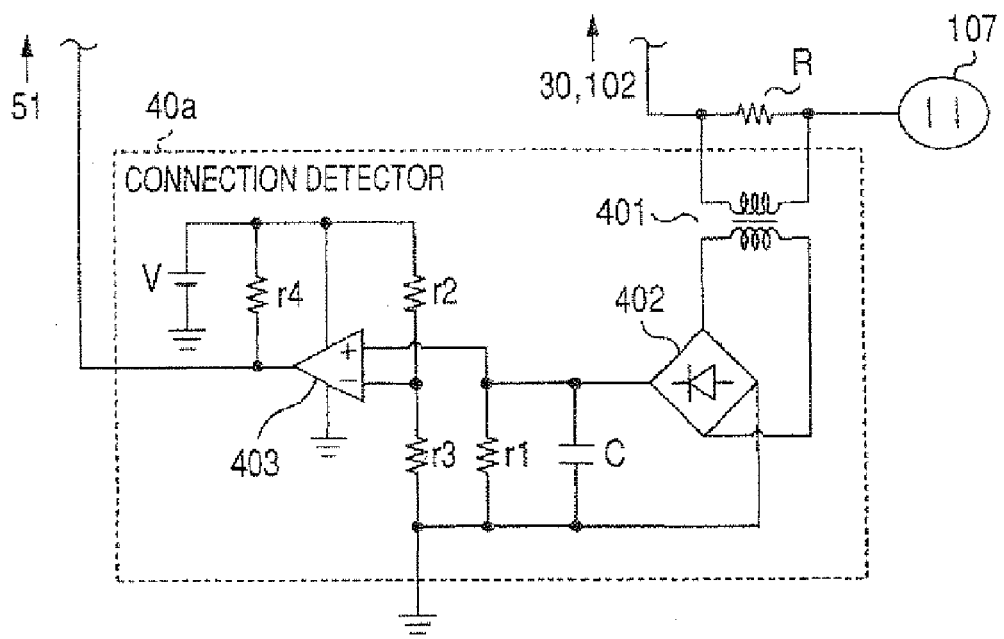
FIGS. 7A and 7B illustrate circuit configuration examples of a connection detector according to the first embodiment.
Figure 7B:
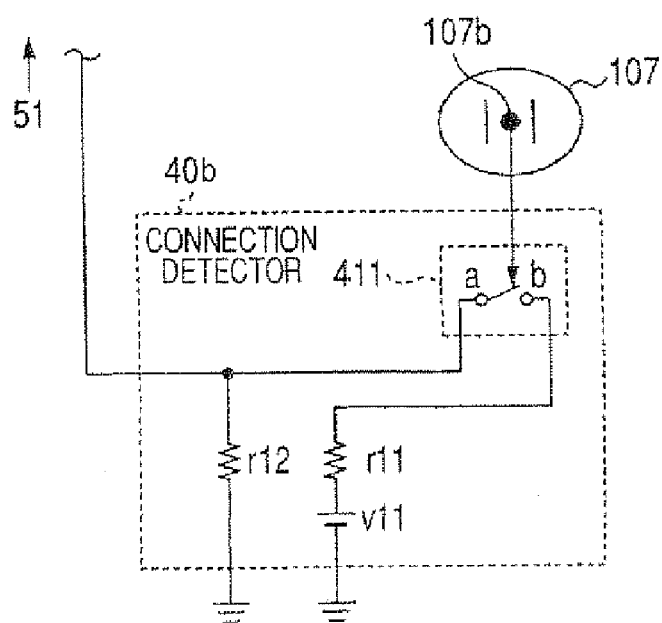

Connection detector 40 detects whether or not an external plug, an external power adapter, or the like is plugged into electrical outlet 107 for device connection. Connection detector 40 electrically or mechanically detects connection to electrical outlet 107. Connection detector 40 only needs to have a configuration that detects connection in at least one of electrical and mechanical methods. FIG. 7A shows a circuit configuration example of connection detector 40a that employs an electrical detection method; FIG. 7B shows a circuit configuration example of connection detector 40b that employs a mechanical detection method.

FIG. 6 shows an example of the electrical detection method of connection to electrical outlet 107. In FIG. 6, connection detector 40, which functions as an example of a voltage drop monitor, includes resistor R provided between electrical outlet 107 and power connector 102, and a voltage drop detection circuit that monitors a voltage drop at resistor R. Connection detector 40 detects connection when the voltage drops more than a predetermined value.

As shown in FIG. 7A, connection detector 40a has detection transformer 401 that detects voltages on both sides of resistor R; bridge rectifying circuit 402 that rectifies a signal detected by detection transformer 401; and comparator 403 that compares an output voltage from bridge rectifying circuit 402 with a reference voltage.

One end of DC output from bridge rectifying circuit 402 is grounded, and the other end is connected to a noninverting input terminal of comparator 403. Further, smoothing capacitor C and resistor r1 are connected in parallel to the output from bridge rectifying circuit 402.

Comparator power supply V is connected to a power terminal of comparator 403. An inverting input terminal of comparator 403 is connected to an output point between voltage dividing resistors r2 and r3 connected in series to power supply V, and is supplied with the reference voltage. Controller 51 is connected to output from comparator 403, and pull-up resistor r4, which pulls up to a power voltage of comparator 403, is also connected thereto.

Thereby, connection detector 40a outputs a low-level signal when the voltage does not drop at resistor R, or a high-level signal when the voltage drops. Thus, controller 50 can detect that a plug of another apparatus is connected to electrical outlet 107.

As an example of the mechanical detection method of connection to electrical outlet 107, connection detector 40 is provided with button 107b that protrudes externally from electrical outlet 107 and that is pressed down by an externally inserted plug and the like. Connection detector 40 detects connection when the button is pressed down.

As shown in FIG. 7B, connection detector 40b has switch 411 linked to button 107b, which is provided protruding externally from electrical outlet 107. Switch 411 has terminals "a" and "b", which are connected when button 107b is pressed down. Terminal "b" of switch 411 is connected to detection power supply v11 and resistor r11. Terminal "a" of switch 411 is connected to controller 50 and to grounded resistor r12.

Thereby, connection detector 40b outputs a low-level signal when button 107b is not pressed down, or a high-level signal when button 107b is pressed down. Thus, controller 50 can detect that a plug of another apparatus is connected to electrical outlet 107.

FIG. 8A is a front view of the electrical outlet; FIG. 8B is a side view of the electrical outlet; FIG. 8C is a perspective view of the electrical outlet. As FIGS. 8A to 8C show, button 107b protrudes externally from electrical outlet 107 so as to be pressed by an externally connected plug and the like. Button 107b is provided, for example, between a pair of plug blade slots 107o of electrical outlet 107. Button 107b does not need to be provided between plug blade slots 107o, but may be provided near plug blade slots 107o. Thereby, connecting a plug or a power adapter to the electrical outlet automatically presses button 107b, thus allowing mechanical detection of electrical outlet 107.

Controller 50 controls entire communication apparatus 110. In addition to the control for normal power line communication, controller 50 functions as a setting controller that controls a negotiation and the like by controlling receiver 10 and transmitter 20, according to a connection status of an external device to electrical outlet 107 as detected by connection detector 40. Display 105 displays a variety of indications based on control of controller 50.

Described below is a setting method of the communication apparatus in a system where communication apparatuses that perform communication and setting need to be set as a master device and a terminal device.

As shown in FIG. 9, when communication apparatus 110 is capable of performing communication, controller 50 first monitors whether or not an external plug is connected to electrical outlet 107, based on a detection result at connection detector 40 (step S1101). When detecting connection of the external plug to electrical outlet 107 (step S1101: Yes), communication apparatus 110 sets itself as a master device (step S1102). On the other hand, when detecting no connection of such external plug to electrical outlet 107 (step S1101: No), communication apparatus 110 sets itself as a terminal device (step S1103). Then, communication apparatus 110 turns on display 105 (display 105a in FIG. 4) as required, so as to notify a user of a setting of communication apparatus 110.

Thereby, in the communication system that requires setting of master and terminal devices, the communication apparatus automatically performs setting thereof according to the connection status at electrical outlet 107 based on the detection result of connection detector 40, thus not requiring the user to perform manual setting of master and terminal devices. Setting of master and terminal devices may be indicated according to connection to the electrical outlet, by painting in the same color a plug (a power adapter) of a terminal device and a electrical outlet of a master device. The terminal device is the communication apparatus whose plug is inserted into a electrical outlet of another communication apparatus. The master device is the communication apparatus that has the electrical outlet into which a plug of another communication apparatus is inserted. For example, when electrical outlet 107 of master device 100M and plug 400T of terminal device 100T in FIG. 4 are painted in the same color (e.g., blue), the user can easily recognize that the communication apparatus that has electrical outlet 107 into which the plug is inserted is the master device and that the communication apparatus whose plug is inserted is the terminal device.

Figure 10:
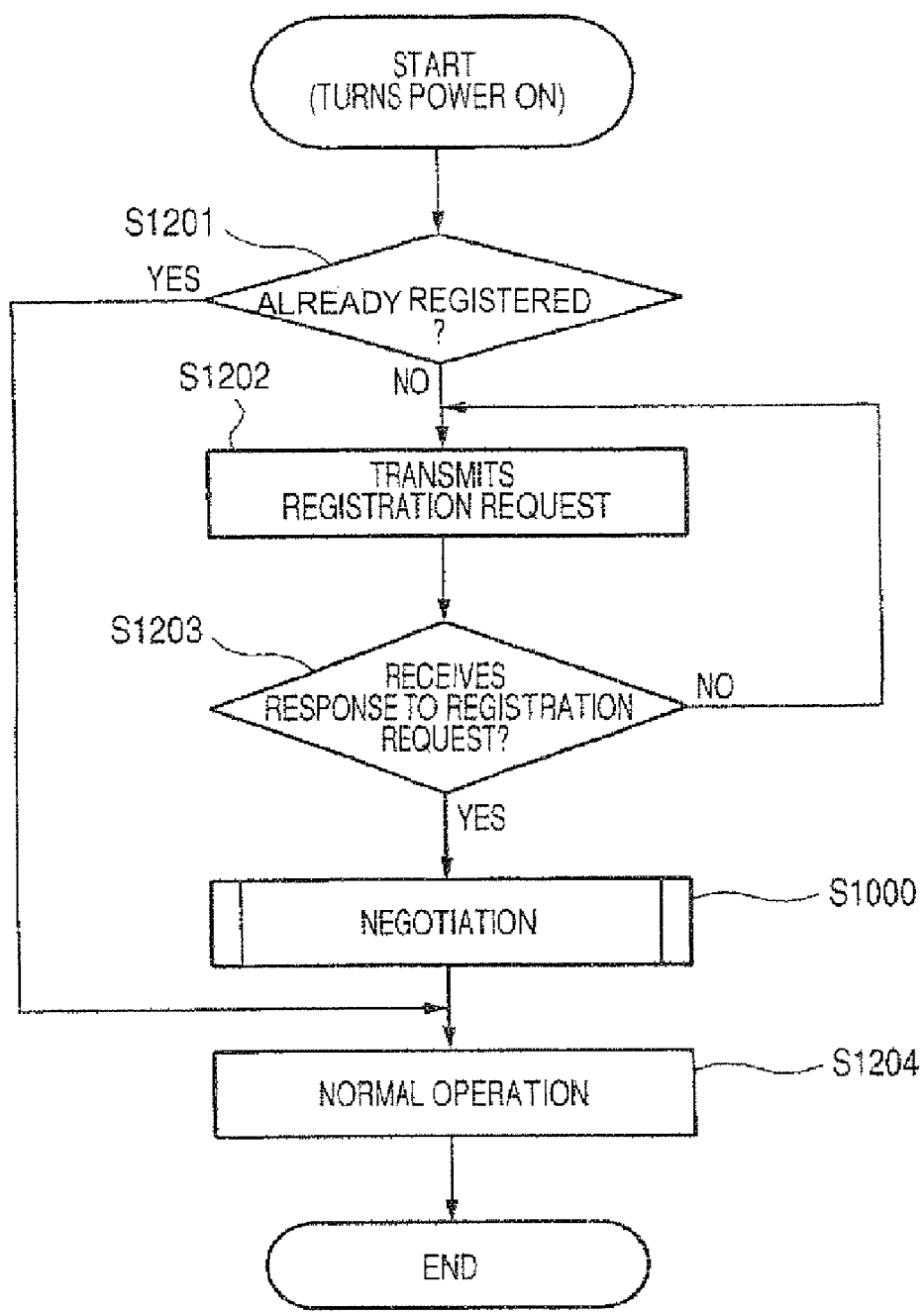
FIG. 10 is a flowchart illustrating an operation procedure on the communication apparatus (as a terminal device) according to the first embodiment.

As shown in FIG. 10, when power is supplied to terminal device 100T and no setting is registered to allow communication with master device 100M (step S1201: No), controller 50T transmits a registration request to master device 100M (step S1202). When receiving a response to the registration request (step S1203), terminal device 100T performs the negotiation shown in FIG. 5 (step S1000). When completing the negotiation, terminal device 100T proceeds to a normal operation (step S1204).

Figure 11:
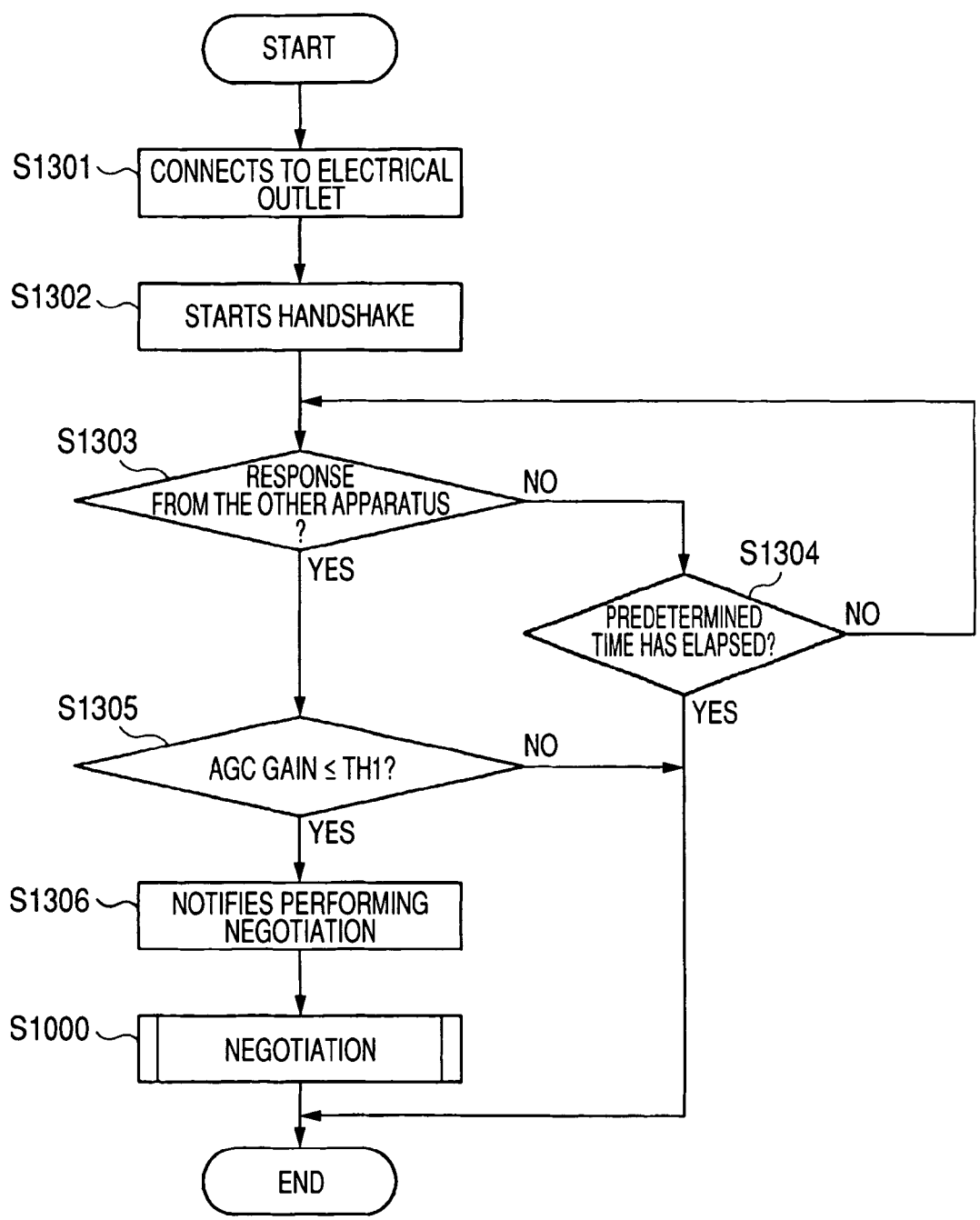
FIG. 11 is a flowchart illustrating a setting procedure according to the first embodiment.

As shown in FIG. 11, when connection detector 40 detects that a plug is connected to electrical outlet 107 (step S1301), a handshake process starts with a connected device (step S1302).

In step S1302, the communication apparatus to which the external device is connected at electrical outlet 107 (communication apparatus 100M in FIG. 4) is set as the master device in the present embodiment as explained in FIG. 9. In the negotiation, including registration, security authentication, and the like of communication apparatuses, terminal device 100T issues a communication request to master device 100M, and the master device transmits a response to the communication request from the terminal device, thereby establishing communication between the mater and terminal devices in the present embodiment. In step S1302, therefore, controller 50 waits for the communication request from the device connected via electrical outlet 107 to be received at receiver 10. The communication request transmitted from the device connected via electrical outlet 107 is an example of a setting signal.

When detecting no communication request from the device connected to electrical outlet 107 (step S1303: No), controller 50 determines whether or not a predetermined time has elapsed (step S1304). When the predetermined time has yet to elapse (step S1304: No), controller 50 returns to step S1303 and monitors the communication request from the device connected to electrical outlet 107. When the predetermined time has elapsed (step S1304: Yes), controller 50 determines that the connected device is not a communication apparatus and then ends the process.

In step S1303, when detecting the communication request from the device connected to electrical outlet 107 (i.e., a communication apparatus; step S1303: Yes), controller 50 determines whether an auto gain at AGC circuit 11 of receiver 10 (hereinafter referred to as an AGC gain) is below predetermined threshold TH1 (step S1305). When the AGC gain is above threshold TH1 (step S1305: No), controller 50 determines that the received communication request is not from the device connected via electrical outlet 107, but from a communication apparatus connected via power connector 102, and then ends the process without performing setting.

On the other hand, when the AGC gain is below threshold TH1 (step S1305: Yes), controller 50 displays on display 105 (display 105b in FIG. 4) that setting is being performed (step S1306), and starts the negotiation shown in FIG. 5 (step S1000).

Described below is a comparizon process between the AGC gain at AGC circuit 11 and threshold TH1 in step S1305. An example is a case where master device 100M shown in FIG. 4 performs setting for communication with terminal device 100T using electrical outlet 107, when master device 100M is connected to wall outlet 500 via power connector 102 and is capable of performing power line communication. In this case, for example, when a communication apparatus (a terminal device) is connected to a wall outlet of a neighbor in collective housing and the like and when the communication apparatus (the terminal device) transmits a communication request signal, master device 100M may receive the communication request signal via wall outlet OL and perform setting, such as registration and the like.

Thus, a parameter that only applies to communication via electrical outlet 107 is set as a communication condition for the negotiation, so as to distinguish the communication from communication via another outlet. The parameter used is, for example, a multi-level value of a modulation scheme applied to communication for setting (e.g., QAM: Quadrature Amplitude Modulation; PAM: Pulse Amplitude Modulation; and the like) and an AGC gain value.

The modulation scheme used for setting via the electrical outlet is a relatively high multi-level modulation scheme for all sub-carriers, such as, for example, 256 QAM or 16 PAM. When the modulation scheme is fixed to the relatively high multi-level modulation scheme, such as 256 QAM, 16 PAM, or the like, a signal is likely to be affected by transmission characteristics. Thus, a signal that can be demodulated is in a close range, such as from a communication apparatus and the like connected to electrical outlet 107.

Further, the AGC value is used to distinguish whether the received signal is from a relatively distant communication apparatus, such as a communication apparatus connected to a neighbor's wall outlet, or a nearby communication apparatus, such as a communication apparatus connected to the electrical outlet. For instance, a signal from a short distance is not attenuated. Thus, hardly any AGC gain is observed and the AGC gain is zero (when the minimum AGC includes a negative value, the AGC gain is the minimum negative value or a value close to the minimum value). A signal from a short distance, but not so close, is slightly attenuated, and thus the AGC gain may be observed more or less. A threshold is used to check the difference, so as to distinguish the signal from the communication apparatus connected to the electrical outlet, from the signal from another communication apparatus, and thus to prevent erroneous setting.

For example, the AGC gain is assumed to be 0 to 48 dB. When transmission and reception is performed via the electrical outlet, the AGC gain is highly likely to be 0. When a signal is transmitted to and received from a neighbor, the AGC gain is unlikely to be 0 due to attenuation, and an attenuation of about 3 dB is likely to be generated. In this case, therefore, when threshold TH1 is set to around 8 dB against the AGC gain, it is possible to distinguish a signal via the electrical outlet from another signal, and thus to reduce a possibility of erroneous setting. The above-described value for threshold TH1 is merely an example, and threshold TH1 may be set to an appropriate value according to transmission characteristics.

Applying the high multi-level modulation scheme to communication for setting and using the AGC gain make it possible to determine whether a signal is from the apparatus connected via electrical outlet 107 or from the apparatus connected via power connector 102, and thereby prevents erroneous setting of the communication apparatus.

Explained above is the case where the communication apparatus to which another communication apparatus is connected at electrical outlet 107 thereof (communication apparatus 100M in FIG. 4) is the master device and the communication apparatus that connects to electrical outlet 107 (communication apparatus 100T in FIG. 4) is the terminal device. However, the setting of master and terminal devices may be reversed.

In this case, communication apparatus 110 transmits a communication request from transmitter 20 based on control of controller 50 in step S1302 in FIG. 11. Then, in step S1303, controller 50 determines whether or not a response as a setting signal is received from a communication apparatus, which is a master device, in response to the transmitted communication request.

In the first embodiment as described above, inserting the plug into the electrical outlet automatically performs the negotiation, and thus allows easy setting.

Second Embodiment

Figure 12:
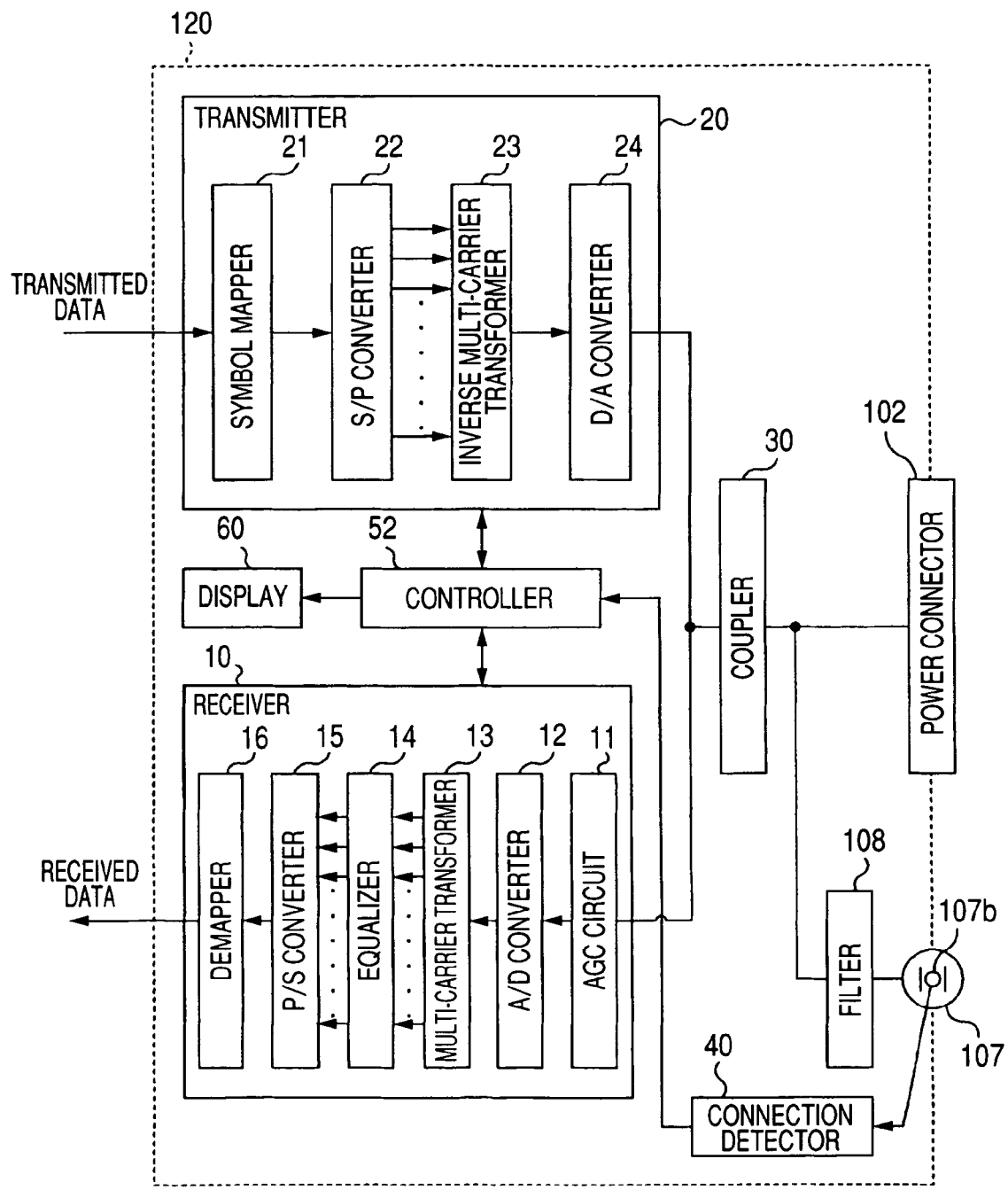
FIG. 12 is a block diagram illustrating a general configuration of a communication apparatus according to a second embodiment.

In FIG. 12, components identical to those in FIG. 1 explained in the first embodiment are provided with identical reference numbers. FIG. 12 shows button 107b provided to electrical outlet 107 as a structure to detect connection of a plug of an external device to electrical outlet 107. Instead of button 107b, however, resistor R shown in FIG. 6 may be provided so that a connection detector monitors a voltage drop at resistor R to detect connection of the plug of the external device.

As shown in FIG. 12, communication apparatus 120 according to a second embodiment has filter 108, which is inserted between electrical outlet 107 and a power line communication path (a communication path that connects power connector 102 and coupler 30).

It is desirable that a signal for setting performed via electrical outlet 107 not externally leak from communication apparatus 120 via power connector 102. Further, since a variety of devices other than a communication apparatus can be connected to electrical outlet 107, noise from the connected device may affect power line communication via power connector 102.

Thus, communication performance via electrical outlet 107 requires only a minimum level that allows communication for control of setting and the like. As shown in FIG. 12, the communication apparatus of the second embodiment is provided with filter 108 between the power line communication path and electrical outlet 107, so as to attenuate a signal in a frequency band used for communication, which is a frequency band that excludes at least an AC power frequency. Filter 108 includes a noise filter, an attenuator, an impedance booster, and the like.

Filter 108 may also have a characteristic suitable for determining whether a signal is from a communication apparatus connected via power connector 102 or from a communication apparatus connected via electrical outlet 107.

On a communication apparatus that has an AGV gain of 48 db at maximum, the AGC gain offsets an attenuation of even 48 dB of a transmission line, such as a power line and the like, when the attenuation is flat. However, a frequency characteristic of an actual transmission line is not flat, and thus it is impossible to perform communication with fixed 256 QAM or 16 PAM due to some attenuation on the transmission line.

Thus, filter 108 is used to achieve flat attenuation in the frequency range so as to create an environment where transmission and reception can be performed with fixed 256 QAM or 16 PAM, for example, even though a relatively large AGC gain may be generated in communication for setting using electrical outlet 107. Thereby, communication via electrical outlet 107 can be distinguished from other communication (e.g., communication from a neighbor), and erroneous setting can be eliminated.

For example, the AGC gain is assumed 0 to 48 dB. When a signal is transmitted to and received from a neighbor, the AGC gain is unlikely to be 0 due to attenuation, and an attenuation of about 30 dB is likely to be generated. When transmission and reception is performed via electrical outlet 107, filter 108 is configured to have an AGC gain of, for example, 24 dB (that is, to provide an attenuator function). In this case, when threshold TH2 is set to around 16 dB against the AGC gain, it is possible to distinguish a signal via electrical outlet 107 from another signal, and thus to significantly reduce a possibility of erroneous setting. Filter 108 can logically be formed of a low pass filter. When an AC bandwidth and a signal bandwidth are significantly different, however, a band pass filter may be used to reduce only a signal in the signal bandwidth. Further, an attenuator or the like may be used to attenuate the signal bandwidth. The above-described value for threshold TH2 is merely an example, and threshold TH2 may be set to an appropriate value according to transmission characteristics.

Figure 13:
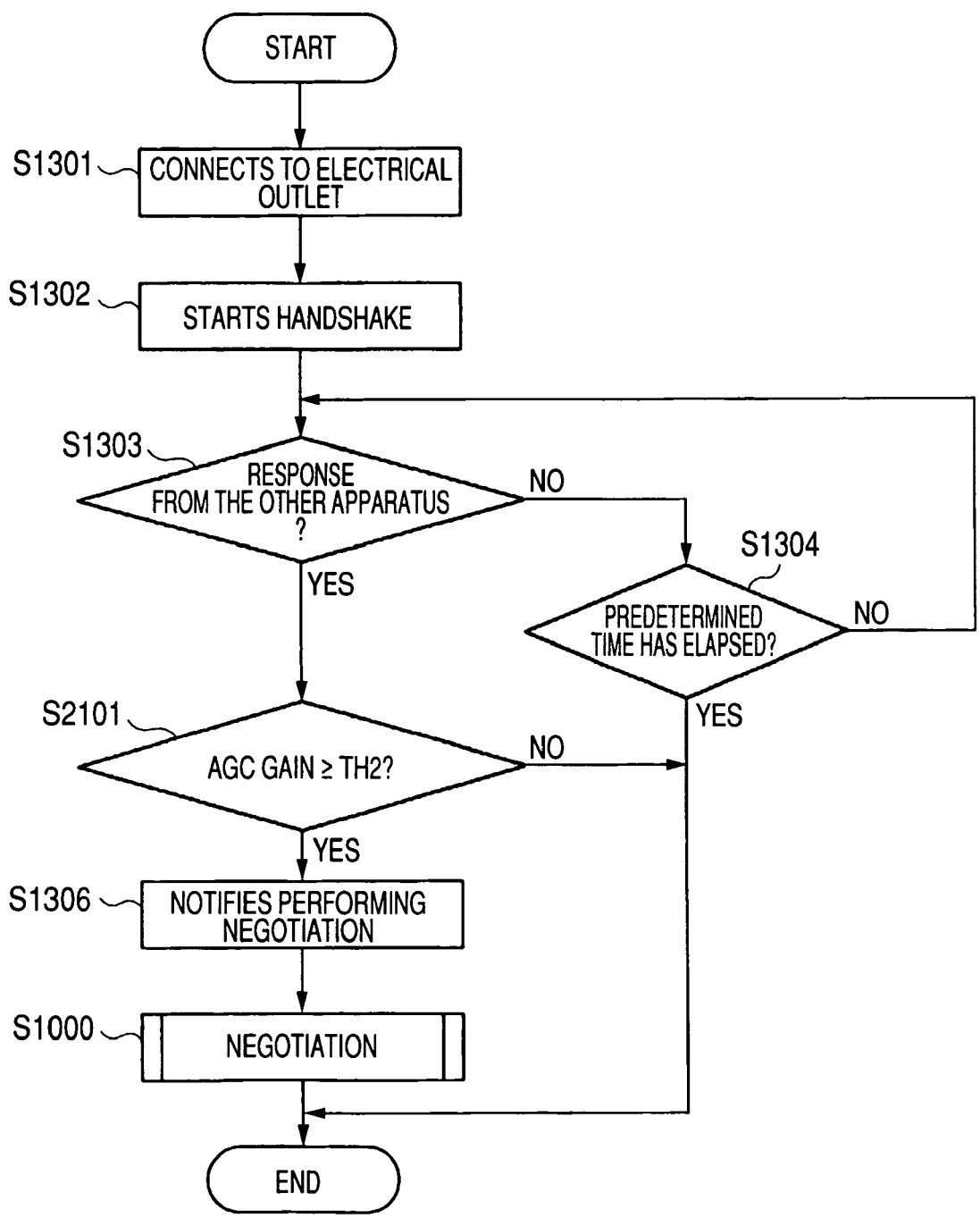
FIG. 13 is a flowchart illustrating a setting procedure of a setting method according to the second embodiment.

In FIG. 13, components identical to those in FIG. 11 are provided with identical reference numbers. As shown in FIG. 13, when connection detector 40 detects that a plug is connected to electrical outlet 107 (step S1301), a handshake process starts with a connected device (step S1302).

When detecting no communication request from the device connected to electrical outlet 107 (step S1303: No), controller 50 determines whether or not a predetermined time has elapsed (step S1304). When the predetermined time has yet to elapse (step S1304: No), controller 50 returns to step S1303 and monitors a communication request from the device connected to electrical outlet 107. When the predetermined time has elapsed (step S1304: Yes), controller 50 determines that the connected device is not a communication apparatus and then ends the process.

In step S1303, when detecting the communication request from the device connected to electrical outlet 107 (step S1303: Yes), controller 50 determines whether an AGC gain at AGC circuit 11 of receiver 10 is above threshold TH2 (step S2101). When the AGC gain is below threshold TH2 (step S2101: No), controller 50 determines that the received communication request is not from the device connected via electrical outlet 107, but from a communication apparatus connected via power connector 102, and then ends the process without performing setting.

On the other hand, when the AGC gain is above threshold TH2 (step S2101: Yes), controller 50 indicates on display 105 (display 105b in FIG. 4) that setting is being performed (step S1306), and starts the negotiation shown in FIG. 5 (step S1000).

The second embodiment as described above can reduce signal leakage or noise from the connoted device.

Figure 14:
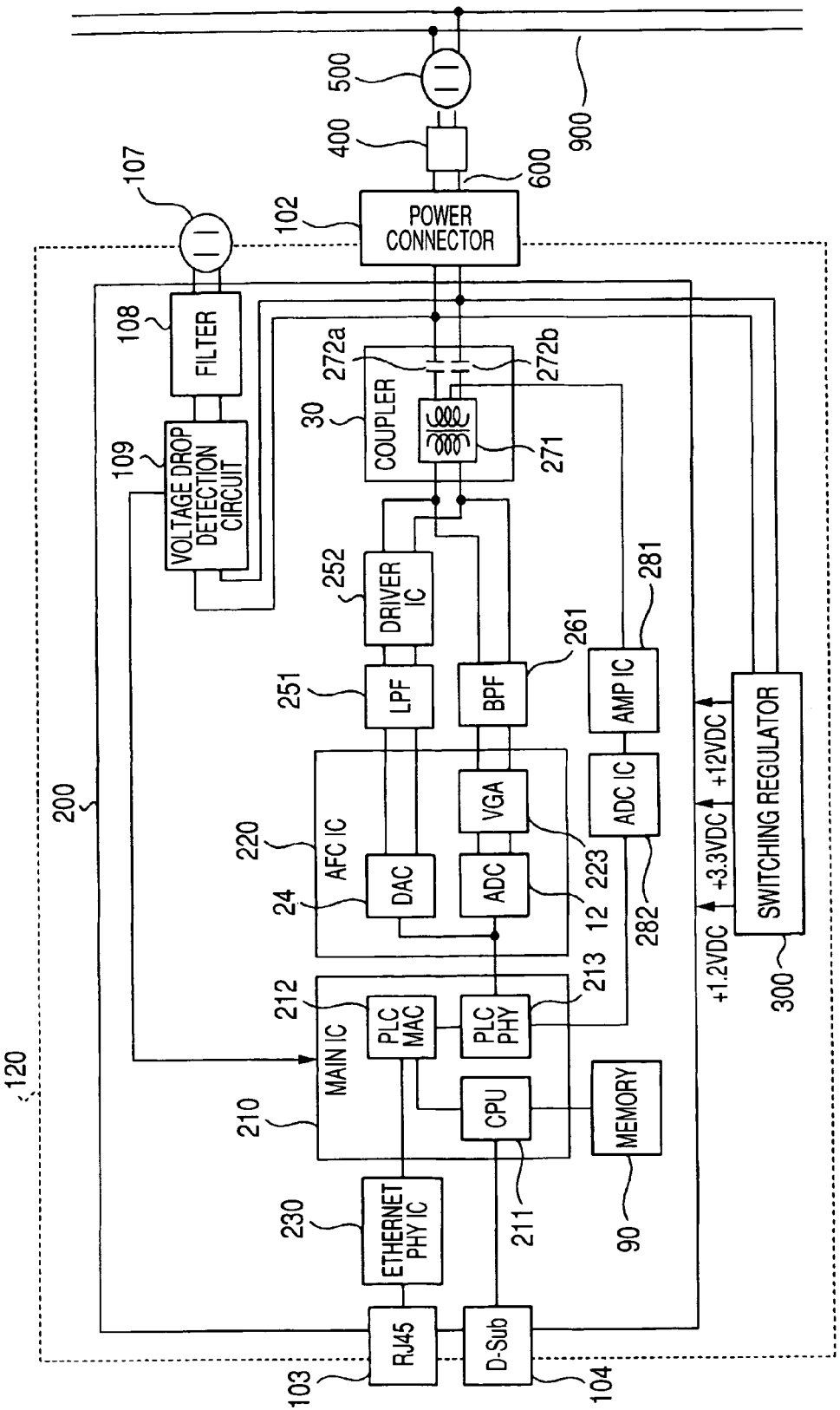
FIG. 14 is a block diagram illustrating a hardware example of the communication apparatus according to the second embodiment.

In FIG. 14, components identical to those in FIG. 3 are provided with identical reference numbers. FIG. 14 shows an example of a communication apparatus provided with a voltage drop monitor circuit as connection detector 40.

As shown in FIG. 14, electrical outlet 107 is branched out from a position between power connector 102 and switching regulator 300 on communication apparatus 120. Filter 108 and voltage drop detection circuit 109 are inserted between electrical outlet 107 and the branching position.

Third Embodiment

Figure 15:
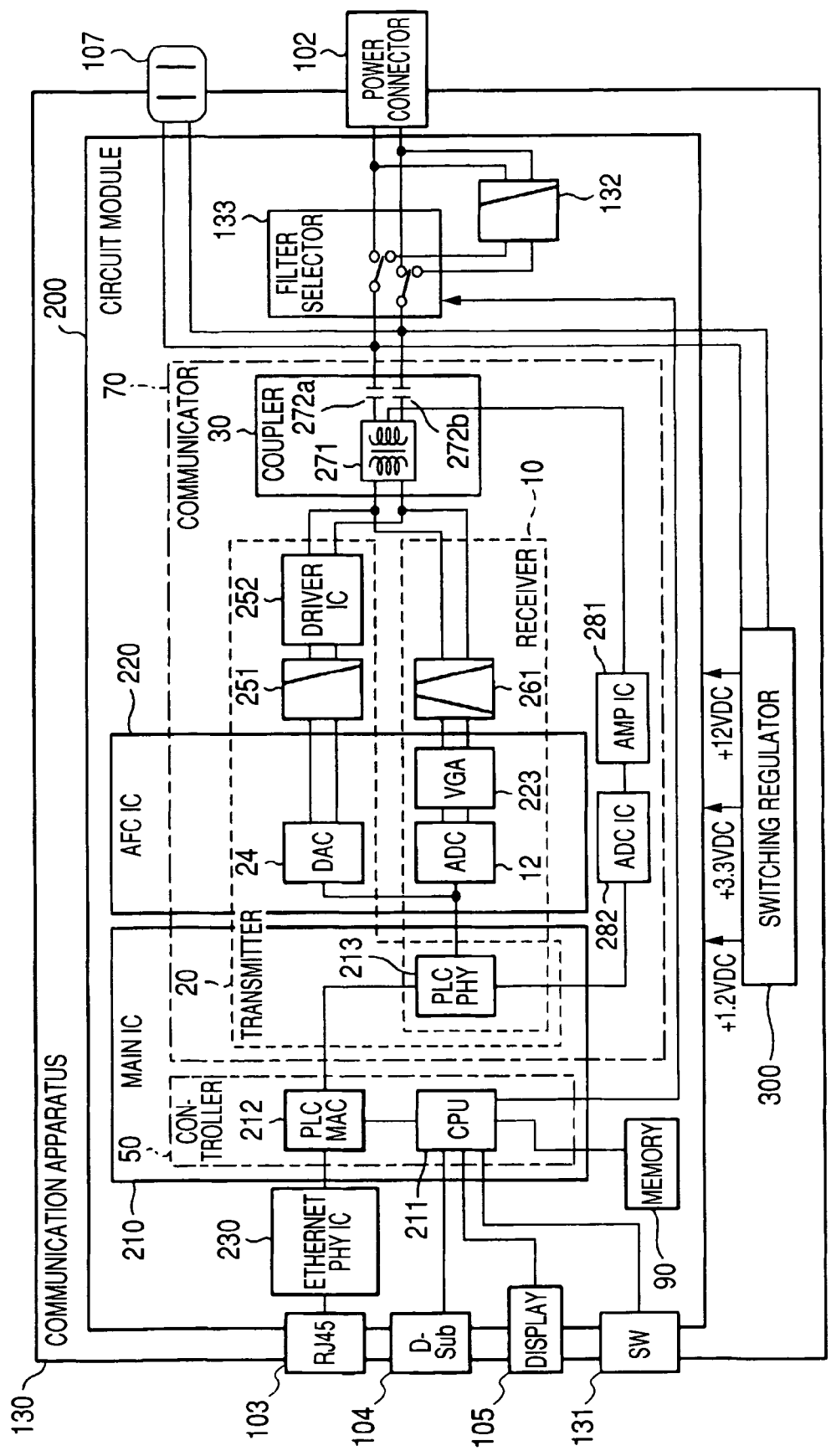
FIG. 15 is a block diagram illustrating a hardware example of a communication apparatus according to a third embodiment.

In FIG. 15, components identical to those in FIG. 3 are provided with identical reference numbers. As shown in FIG. 15, communication apparatus 130 according to the present embodiment has switch (SW) 131, filter 132, and filter selector 133, in addition to the components explained in FIG. 1.

Switch 131 operates as an example of an instruction input unit that receives an instruction that permits to start a negotiation. Switch 131 receives operation input when the button is pressed, for example, and outputs an instruction to CPU 211. Provided between switch 131 and CPU 211 is a circuit similar to connection detector 40b as shown in FIG. 7B, for example, which allows CPU 211 to detect the pressing of switch 131.

Filter 132 attenuates a signal in a frequency band that excludes at least an AC power frequency (e.g., 60 Hz). As filter 132, a low pass filter is used, for example, as shown in the drawing. One end of filter 132 is connected to power connector 102, and the other end is connected to filter selector 133.

Filter selector 133, which operates as an example of a path selector, selects one of a first path and a second path to connect power connector 102 and electrical outlet 107 based on an instruction from CPU 211. The first path is via filter 132; the second path is not via filter 132. Filter selector 133 includes two relay switches, for example.

Figure 16A:
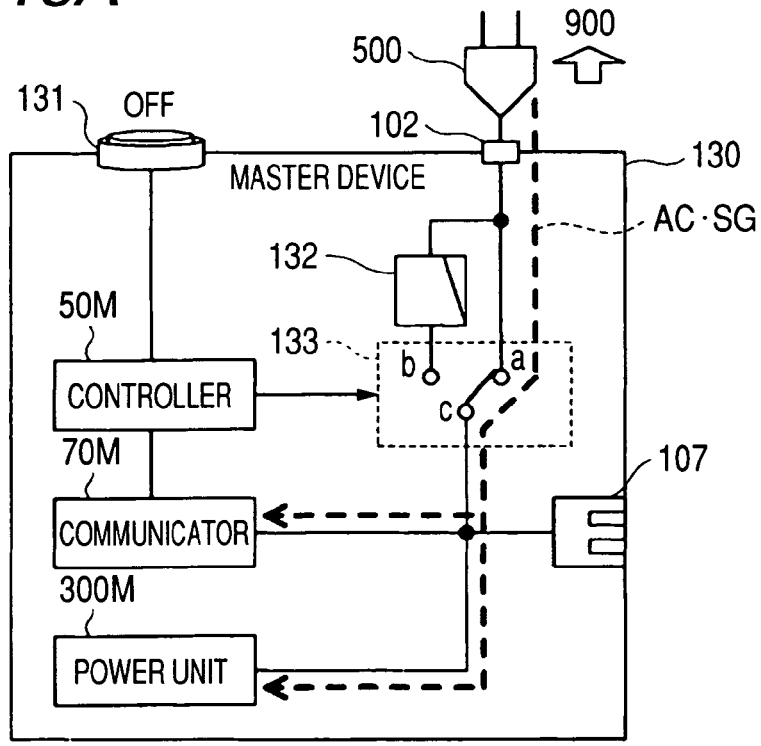
FIGS. 16A and 16B illustrate an overview of operations of the communication apparatus according to the third embodiment.
Figure 16B:
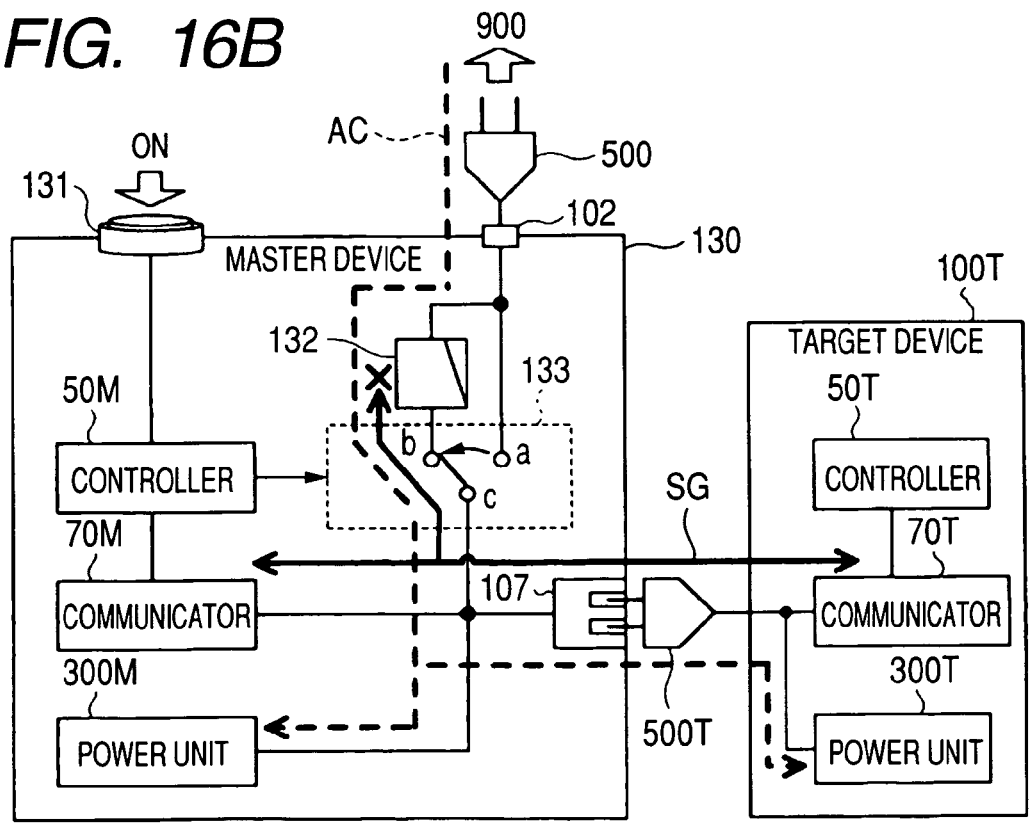

FIG. 16A shows operations of communication apparatus 130 during normal operation; FIG. 16B shows operations of communication apparatus 130 during the negotiation. The present embodiment describes communication apparatus 130 that operates as a master device (hereinafter referred to as a master device). Connected to electrical outlet 107 of master device 130 is communication apparatus 100T that performs setting as a terminal device (hereinafter referred to as a terminal device), which has a configuration similar to communication apparatus 100 shown in FIG. 3. To facilitate understanding of the embodiment, FIGS. 16A and 16B show only key components of master device 130 and terminal device 100T from the hardware block diagrams in FIGS. 15 and 3. In order to distinguish the master and terminal devices, "M" for master device 130 or "T" for terminal device 100T is suffixed to controller 50, communicator 70, and power unit 300.

As shown in FIG. 16A, when switch 131 does not provide an instruction to start the negotiation on communication apparatus 130, filter selector 133 selects terminal a as a connecting terminal of terminal c. In other words, the path not via filter 132 is selected to connect from power connector 102 to communicator 70M, to power unit 300M, and to electrical outlet 107.

Therefore, both AC signal AC and power line communication signal SG input from power line 900 via plug 500 are input to communicator 70M and power unit 300M (further to a device connected to electrical outlet 107 when such device is connected). That is, master device 130 is capable of performing power line communication via power line 900. Plug 500 operates as an example of the electrical inlet.

As shown in FIG. 16B, when switch 131 is pressed to provide an instruction to start the negotiation on master device 130, controller 50M controls filter selector 133 so as to switch the path. Filter selector 133 selects terminal b as a connecting terminal of terminal c based on the instruction from controller 50M. In other words, the path via filter 132 is selected to connect between communicator 70M, power unit 300M and electrical outlet 107, and power connector 102.

Since the signal frequency band attenuated by filter 132 excludes at least the AC power frequency, AC signal AC input from power line 900 via plug 500 is supplied to power unit 300M and to power unit 300T of terminal device 100T via electrical outlet 107.

Meanwhile, power line communication signal SG transmitted and received between communicator 70M of master device 130 and communicator 70T of terminal device 100T is blocked by filter 132, and thus does not leak to power line 900 from power connector 102. Thereby, a communication signal does not leak externally when master device 130 and terminal device 100T perform setting, for example, thus preventing terminal device 100T from performing erroneous setting with a communication apparatus not meant for setting, such as a neighbor's communication apparatus and the like.

Figure 17:
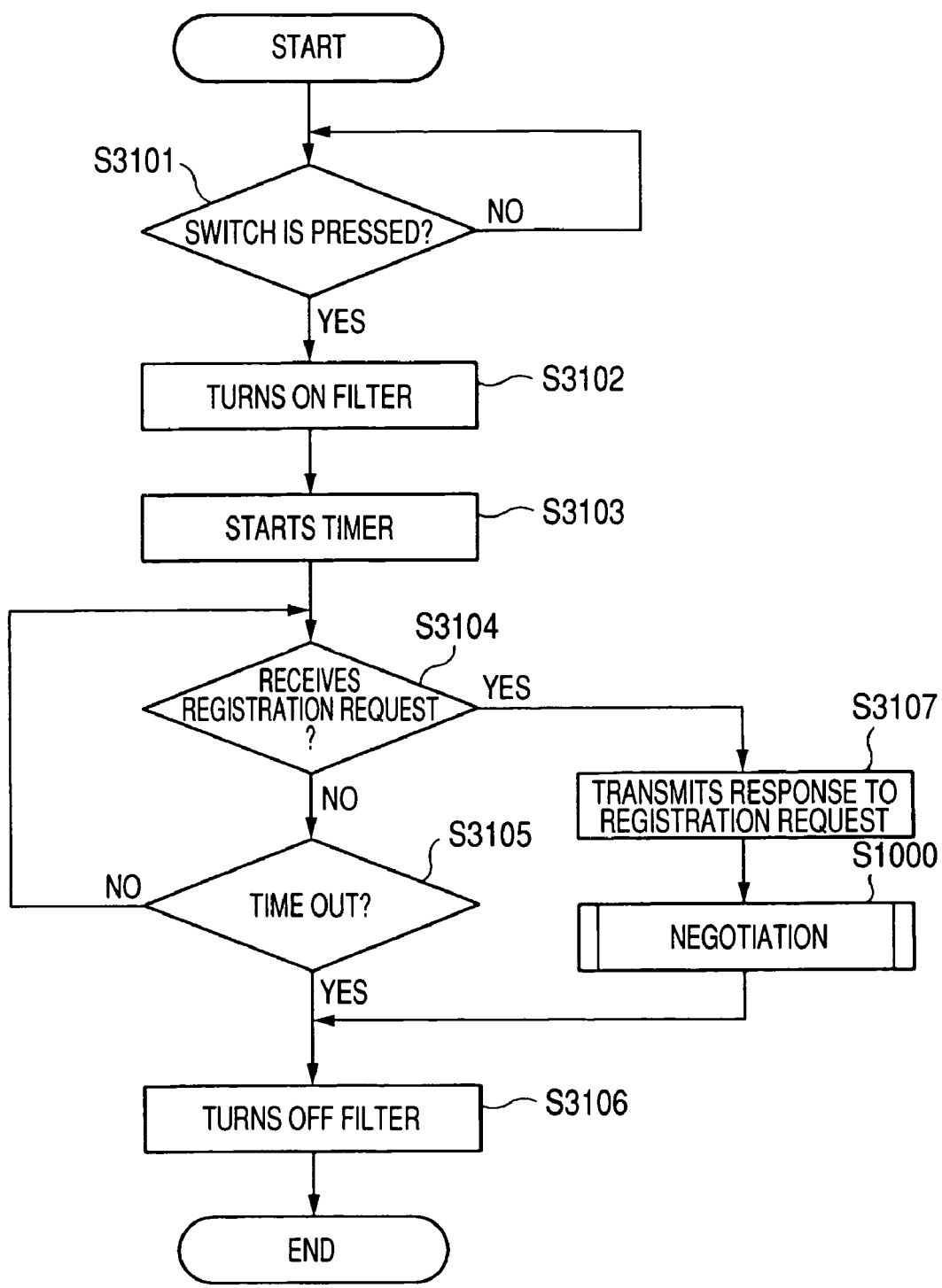
FIG. 17 is a flowchart illustrating an operation procedure on the communication apparatus (as a master device) according to the third embodiment.

FIG. 17 shows an operation procedure on master device 130. An operation procedure on terminal device 100T after power is supplied is the same as shown in FIG. 10.

On master device 130, controller 50M monitors whether or not switch 131 is pressed (step S3101). When switch 131 is pressed, controller 50M switches filter selector 133 so as to connect terminal c and terminal b (step S3102). That is, filter 132 is selected. Thereby, a power line communication signal exchanged with terminal device 100T connected via electrical outlet 107 is blocked by filter 132, and thus does not leak to power line 900 via power connector 102.

Then, controller 50M starts a timer (not shown in the drawing; step S3103), and determines whether or not controller 50M receives a registration request from terminal device 100T (step S3104). When receiving no registration request (step S3104: No), controller 50M determines whether or not a predetermined time has elapsed since the timer started in step S3103 (step S3105). When determining that the time has yet to elapse (step S3105: No), controller 50M returns to step S3104 to monitor receipt of the registration request.

When determining that the time has elapsed (step S3105: Yes), controller 50M switches filter selector 133 so as to connect terminal c and terminal a (step S3106). That is, the path not via filter 132 is selected to connect between communicator 70M, power unit 300M and electrical outlet 107, and power connector 102. Thereby, both master device 130 and terminal device 100T can connect to power line 900.

On the other hand, when receiving the registration request (step S3104: Yes), controller 50M transmits a response to the registration request (step S3107), and executes a process similar to the negotiation shown in FIG. 5 (step S1000). More specifically, setting is performed while a power line communication signal exchanged with terminal device 100T is being blocked by filter 132, and thus does not flow to power connector 102. When completing the negotiation, controller 50 proceeds to step S3106 and switches filter selector 133.

In the third embodiment as described above, inputting the instruction to start the negotiation connects power connector 102 and electrical outlet 107 via filter 132, thus preventing information about the negotiation with terminal device 100T connected via electrical outlet 107 from leaking externally through power line 900 via power connector 102. Thereby, terminal device 100T is prevented from performing erroneous setting with a neighbor's communication device and the like.

Fourth Embodiment

Figure 18:
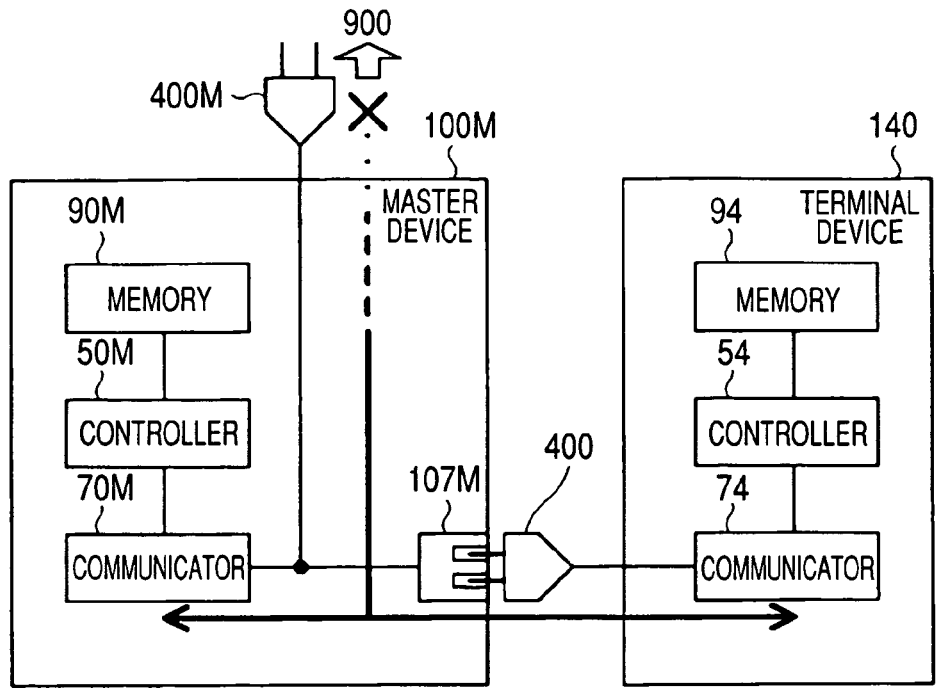
FIG. 18 illustrates a communication apparatus according to a fourth embodiment during a negotiation.

As shown in FIG. 18, terminal device 140 is connected to electrical outlet 107 of master device 100M in the present embodiment. Then, master device 100M performs setting of terminal device 140 connected to electrical outlet 107M.

Master device 100M and terminal device 140 have a configuration similar to communication apparatus 100 shown in FIG. 3. To facilitate understanding of the embodiment, however, FIG. 18 shows only key components from the hardware block diagram in FIG. 3. Further, terminal device 140 has controller 54, communicator 74, and memory 94, which correspond to controller 50, controller 70, and memory 90 in FIG. 3 respectively.

Figure 19:
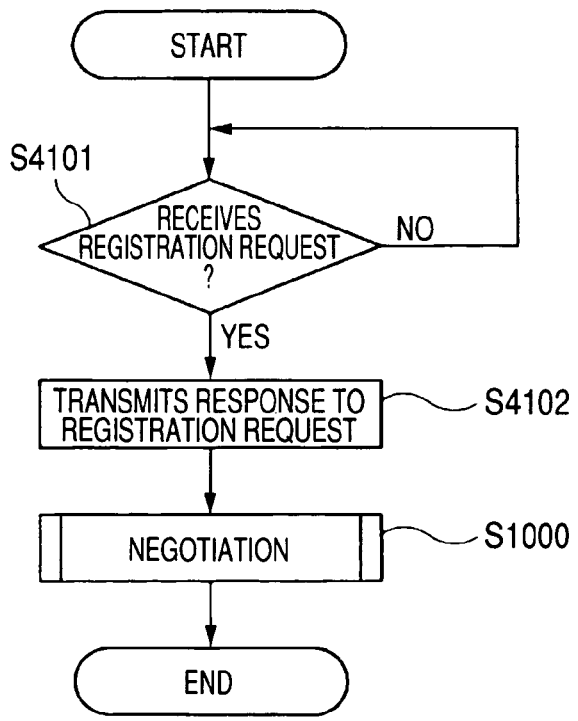
FIG. 19 is a flowchart illustrating an operation procedure on the communication apparatus (as a master device) according to the fourth embodiment.

As shown in FIG. 19, controller 50M monitors whether or not master device 100M receives a registration request (step S4101). When receiving the registration request (step S4101: Yes), controller 50M transmits a response to the registration request to terminal device 140 (step S4102). Then, controller 50M performs setting similar to FIG. 5 (step S1000).

More specifically, master device 100M starts a negotiation upon receiving the registration request. Setting is thus initiated by receipt of the registration request from terminal device 140 connected via electrical outlet 107. Therefore, setting is performed automatically only when terminal device 140 connected via electrical outlet 107 requires the negotiation.

Figure 20:
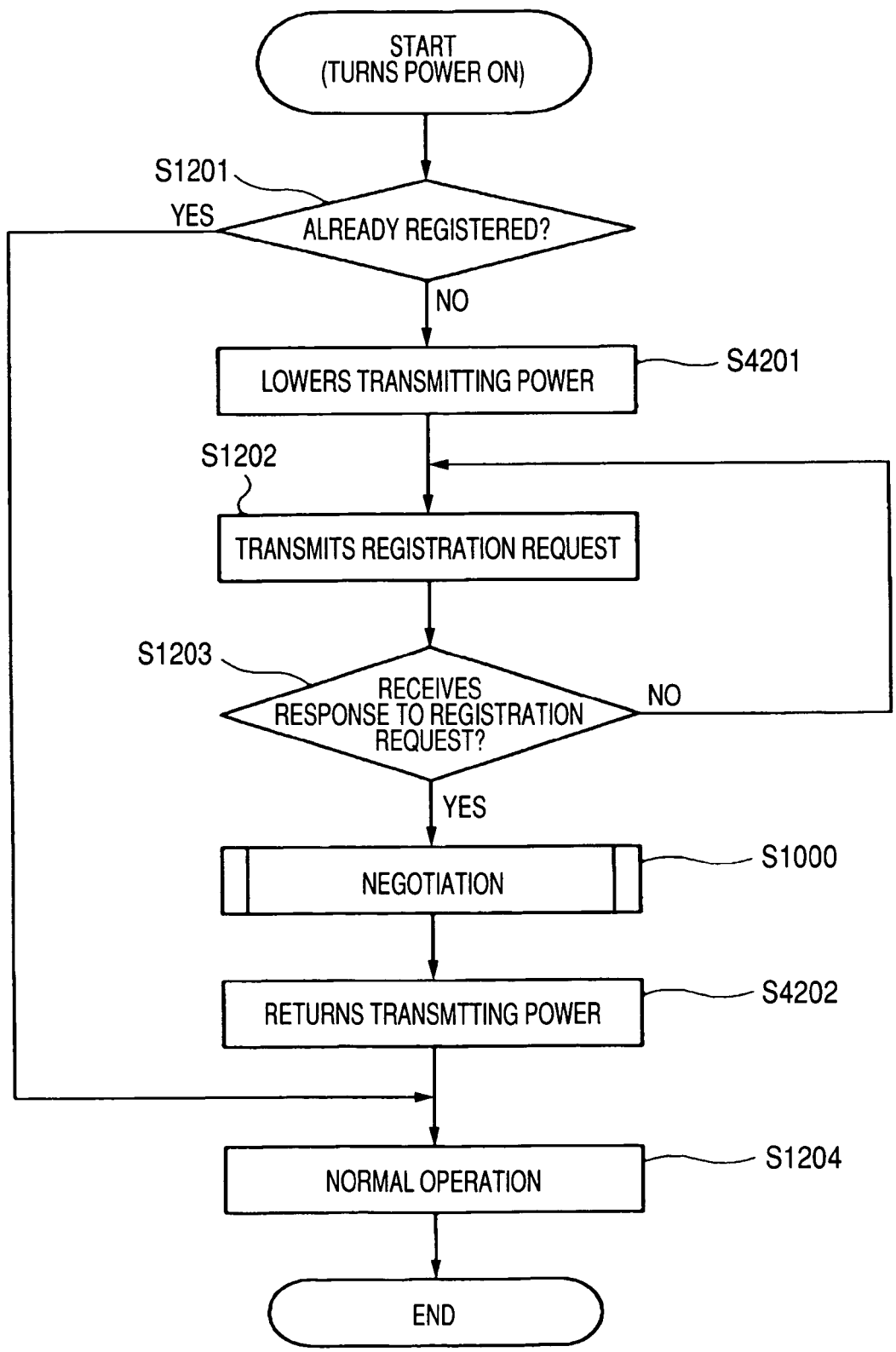
FIG. 20 is a flowchart illustrating an operation procedure on the communication apparatus (as a terminal device) according to the fourth embodiment.

In FIG. 20, components identical to those in FIG. 10 are provided with identical reference numbers. As shown in FIG. 20, when no setting is registered on terminal device 140 to allow communication with master device 100M (step S1201: No), controller 54 lowers transmitting power, which is an example of transmitting output strength of communicator 74 (step S4201). Then, terminal device 140 transmits a registration request to master device 100M (step S1202). When receiving a response to the registration request (step S1203), terminal device 140 performs the negotiation as shown in FIG. 5 (step S1000). When completing the negotiation, controller 54 returns the transmitting power to an original level (step S4202), and proceeds to a normal operation (step S1204).

As described above, terminal device 140 communicates with master device 100M at lower transmitting power during the negotiation than in normal communication, thus preventing a communication signal output from terminal device 140 from leaking to power line 900 via plug 400M of master device 100M, as shown in FIG. 18.

In the fourth embodiment as described above, terminal device 140 communicates at the low transmitting output strength during the negotiation, thus preventing information about the negotiation from leaking externally through power line 900 via power connector 102 of master device 100M, and controlling power consumption of terminal device 140 during the negotiation.

Fifth Embodiment

Figure 21:
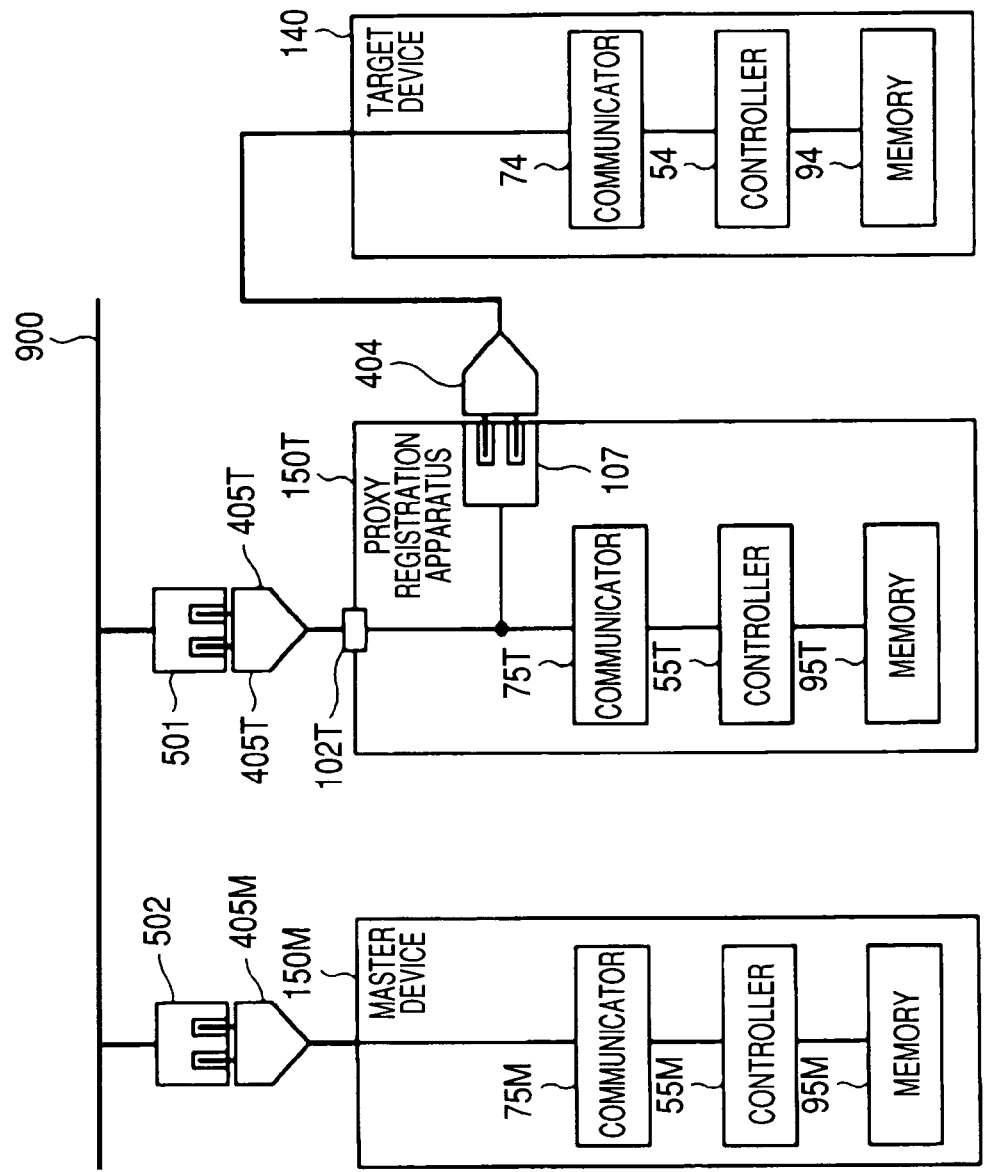
FIG. 21 illustrates a communication apparatus according to a fifth embodiment during a negotiation.

In FIG. 21, components identical to those in FIG. 18 explained in the fourth embodiment are provided with identical reference numbers. As shown in FIG. 21, master device 150M is connected to terminal device (hereinafter referred to as a proxy registration apparatus) 150T via plug 405M, outlet 502, power line 900, outlet 501, and plug 405T. Plug 405T operates as an example of the electrical inlet. Master device 150M and proxy registration apparatus 150T have a configuration similar to communication apparatus 100 shown in FIG. 3. To facilitate understanding of the embodiment, however, FIG. 21 shows only key components from the hardware block diagram in FIG. 3. Communicator 75M, controller 55M, and memory 95M of master device 150M and communicator 75T, controller 55T, and memory 95T of proxy registration apparatus 150T correspond to communicator 70, controller 50, and memory 90 shown in FIG. 3 respectively.

Terminal device 140 that operates in the same manner as in the fourth embodiment is connected to electrical outlet 107 of proxy registration apparatus 150T via plug 404.

Proxy registration apparatus 150T performs setting so as to enable terminal device 140, which is connected to electrical outlet 107, to communicate with master device 150M connected through power line 900 via power connector 102T.

Figure 22:
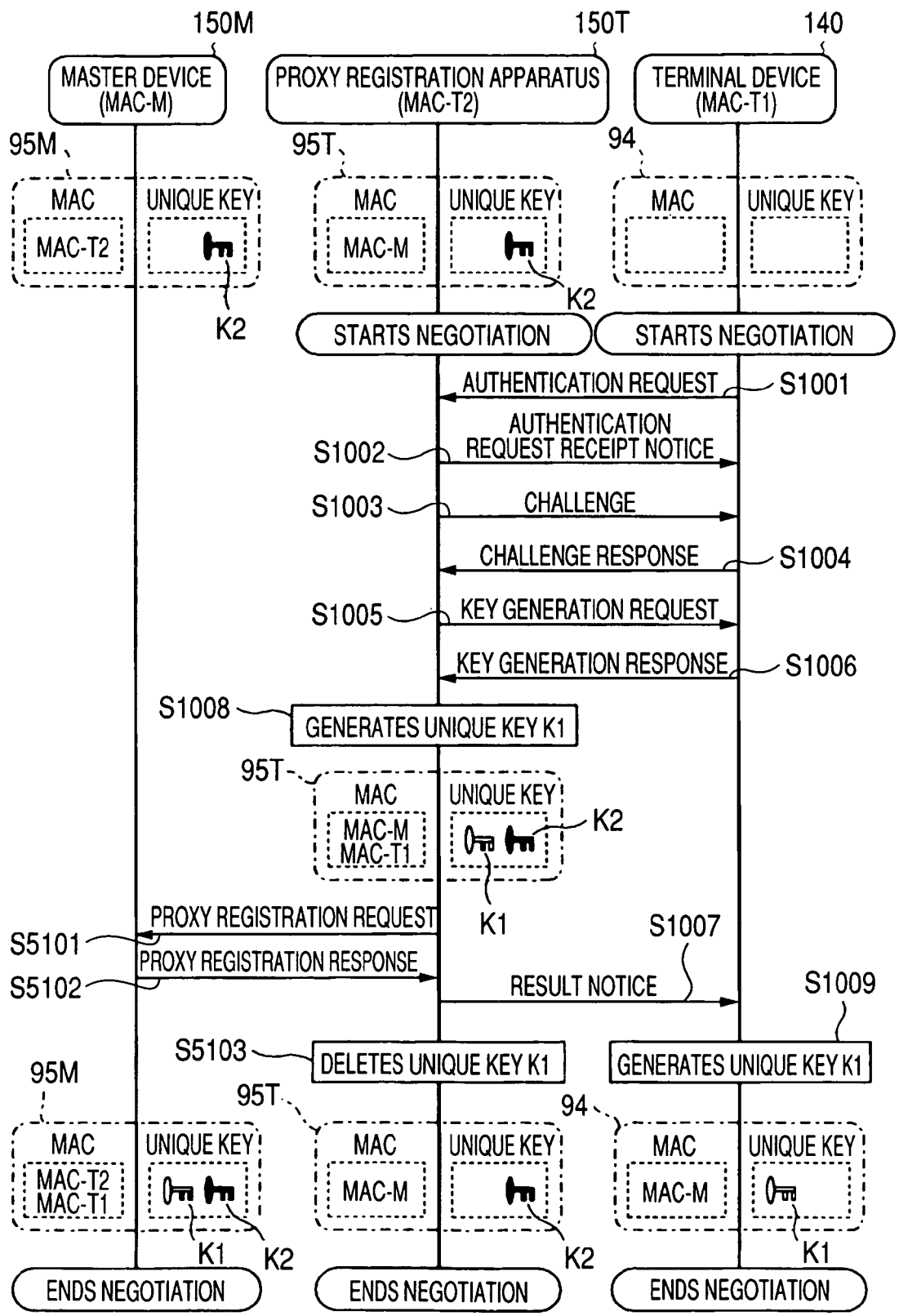
FIG. 22 is a sequence diagram illustrating a setting procedure on the communication apparatus according to the fifth embodiment.

In FIG. 22, components identical to those in FIG. 5 are provided with identical reference numbers. A MAC address of master device 150M is indicated as MAC-M, a MAC address of proxy registration apparatus 150T as MAC-T2, and a MAC address of terminal device 140 as MAC-T1.

As shown in FIG. 22, proxy registration apparatus 150T and master device 150M have completed a negotiation and are capable of performing communication. Thus, memory 95M of master device 150M stores MAC address MAC-T2 of proxy registration apparatus 150T and unique key K2, which is unique encryption key data shared with proxy registration apparatus 150T. Further, memory 95T of proxy registration apparatus 150T stores MAC address MAC-M and unique key K2 of master device 150M.

Pre-setting operations on proxy registration apparatus 150T and terminal device 140 are the same as steps S4101 and S4102 in FIG. 19 and steps S1201 to S1203 in FIG. 20 respectively. When the negotiation starts, proxy registration apparatus 150T and terminal device 140 perform steps S1001 to S1006. Since terminal device 140 transmits a signal in steps S1001, S1004, and S1006 while keeping transmitting power low, terminal device 140 can avoid erroneous setting with a communication apparatus other than proxy registration apparatus 150T.

Then, proxy registration apparatus 150T creates unique key K1, which is unique encryption key data for communication between master device 150M and terminal device 140 (step S1008). As a result, memory 95T of proxy registration apparatus 150T stores MAC address MAC-T1 and unique key K1 of terminal device 140, in addition to MAC address MAC-M and unique key K2 of master device 150M.

Proxy registration apparatus 150T encrypts MAC address MAC-T1 and unique key K1 of terminal device 140 with unique key K2, and transmits the encrypted data to master device 150M in order to request proxy registration (step S5101). When properly receives the proxy registration request, master device 150M returns a response for proxy registration to proxy registration apparatus 150T (step S5102). Then, proxy registration apparatus 150T notifies terminal device 140 of the result (step S1007), and terminal device 140 generates unique key K1 (step S1009). Proxy registration apparatus 150T deletes unique key K1 owned by terminal device 140 and master device 150M (step S5103).

Thereby, memory 95M of master device 150M stores MAC address MAC-T1 and unique key K1 of terminal device 140, in addition to MAC address MAC-T2 and unique key K2 of proxy registration apparatus 150T. Further, memory 95T of terminal device 140 stores MAC address MAC-M and unique key K1 of master device 150M. Thus, terminal device 140 and master device 150M are capable of performing communication.

Terminal device 140, which prevents erroneous setting by lowering the transmitting power during the negotiation, needs to communicate with master device 150M at a close distance. Proxy registration apparatus 150T, which performs setting of terminal device 140 on behalf of master device 150M, allows setting even when master device 150M and terminal device 140 are not able to communicate at a close distance.

In the fifth embodiment as described above, the proxy registration apparatus performs setting for terminal device 140 connected to electrical outlet 107, on behalf of master device 150M connected via power connector 102. Thus, setting can be easily performed for registration between the master and terminal devices, even when terminal device 140 cannot connect to and communicate via the electrical outlet of master device 150M, such as, for example, when master device 150M is installed to a power distribution panel and the like.

Sixth Embodiment

Figure 23:
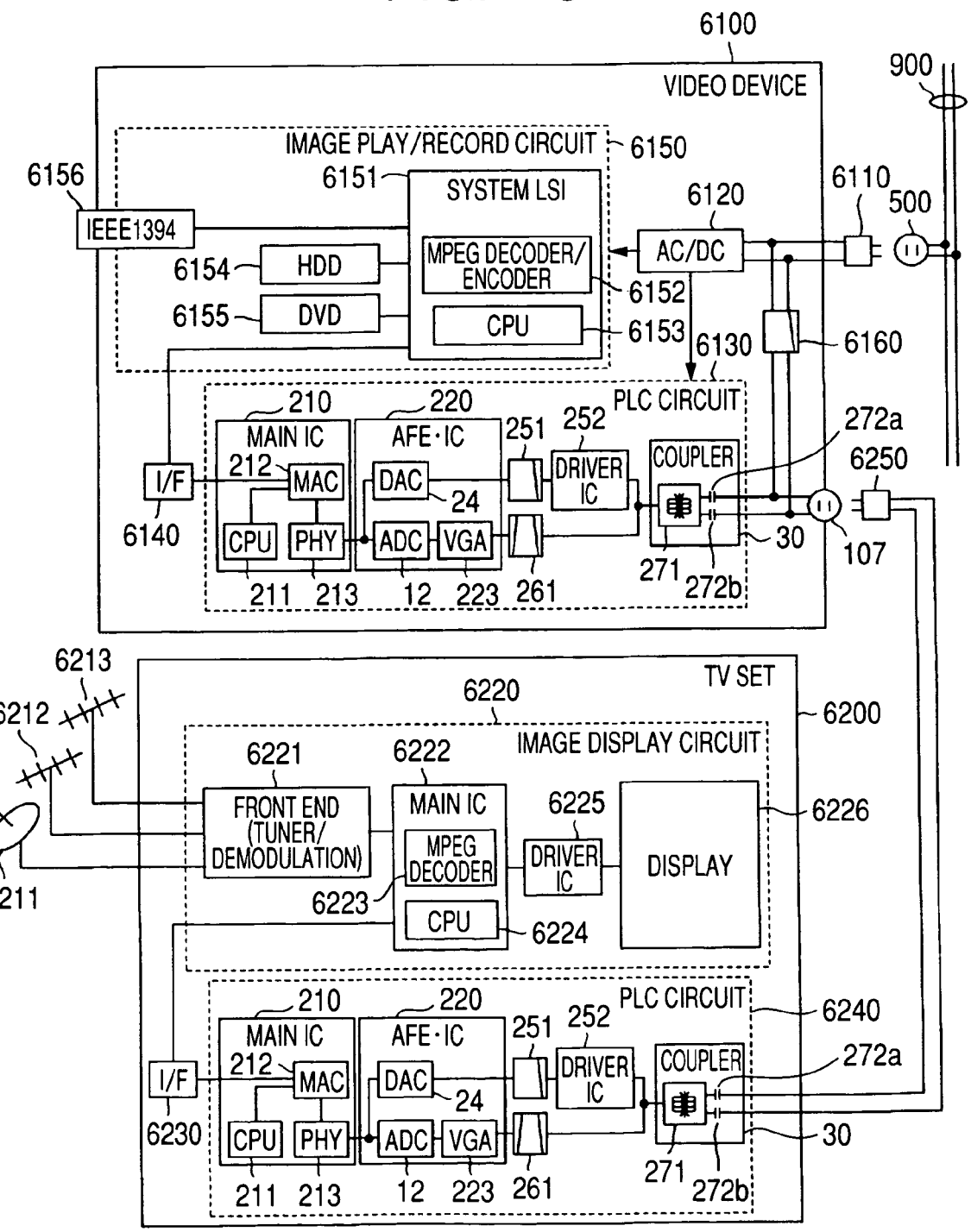
FIG. 23 is a block diagram illustrating a main configuration of a power line communication system according to a sixth embodiment.

In FIG. 23, components identical to those in FIG. 3 are provided with identical reference numbers. As shown in FIG. 23, the present embodiment explains a system wherein television set 6200, as an example of an image output apparatus, and video device 6100, as an example of an image capture apparatus, perform power line communication.

Television set 6200 has image display circuit 6220 and PLC circuit 6240, which is connected to image display circuit 6220 via interface (I/F) 6230.

Image display circuit 6220 has front end 6221, main IC 6222, driver IC 6225, and display 6226. Connected to front end 6221 are antennas to receive airwaves, which include antenna 6211 that receives BS (Broadcasting Satellite) and CS (Communication Satellite) broadcasting, antenna 6212 that receives analog terrestrial broadcasting, and antenna 6213 that receives digital terrestrial broadcasting. Front end 6221 selects a broadcasting station specified on an operation unit (not shown in the drawing) and demodulates a broadcasting wave received through the antenna.

Main IC 6222 has MPEG decoder 6223 and CPU 6224. Based on control of CPU 6224, main IC 6222 displays image data demodulated at front end 6221 on display 6226 via driver IC 6225. Further, MPEG decoder 6223 decodes image data encoded in MPEG (Moving Picture Expert Group), which are received from video device 6100 via PLC circuit 6240, and displays the decoded data on display 6226 via driver IC 6225.

PLC circuit 6240 has main IC 210, AFE IC 220, an Ethernet PHY IC, low pass filter 251, driver IC 252, band pass filter 261, and coupler 30. Main IC 210 includes CPU 211, PLC MAC block 212, and PLC PHY block 213. AFE IC 220 includes D/A converter 24, A/D converter 12, and variable gain amplifier 223. Coupler 30, which includes coil transformer 271 and coupling capacitors 272a and 272b, is connected to plug 6250.

Video device 6100 has plug 6110, which operates as an example of the electrical inlet; AC/DC conversion circuit 6120 connected to plug 6110; PLC circuit 6130; interface (I/F) 6140; image play/record circuit 6150, which operates as an example of an image capture unit; filter 6160; and electrical outlet 107 that is electrically connected to plug 6110 and operates as an example of an outlet that externally outputs power.

AC/DC conversion circuit 6120, which is connected to power line 900 via plug 6110 and outlet 500, converts an AC signal input from power line 900 into a DC signal, and inputs power to PLC circuit 6130 and image play/record circuit 6150. PLC circuit 6130 has a configuration similar to PLC circuit 6240 of television set 6200 and operates as an example of a power line communicator. CPU 211 operates as an example of a setting controller that performs setting of a communication apparatus connected to electrical outlet 107, such as PLC circuit 6240 of television set 6200 and the like.

Image play/record circuit 6150 has system LSI 6151; HDD (Hard Disk Drive) 6154; DVD (Digital Versatile Disk) drive 6155; and connector 6156, such as IEEE (Institute of Electrical and Electronic Engineers) 1394 and the like.

System LSI 6151 has MPEG decoder/encoder 6152 and CPU 6153. Based on control of CPU 6153, MPEG decoder/encoder 6152 encodes image data received from television set 6200 connected to electrical outlet 107 via PLC circuit 6130 in MPEG, and outputs the encoded data to HDD 6154, DVD drive 6155, or connector 6156. Further, MPEG decoder/encoder 6152 decodes MPEG-encoded image data input from HDD 6154, DVD drive 6155, or connector 6156, and outputs the decoded data to television set 6200 via interface 6140, PLC circuit 6130, and electrical outlet 107.

Thereby, video device 6100 and television set 6200 can transmit and receive the image data using power line communication. The size of the image data exchanged between video device 6100 and television set 6200 is substantially large. Thus, leakage of the image data from plug 6110 of video device 6100 to power line 900 via outlet 500 may affect traffic on another power line communication network connected to power line 900.

For prevention purposes, video device 6100 of the present embodiment has filter 6160 that is connected between a path connecting electrical outlet 107 and PLC circuit 6130 and plug 6110, so as to attenuate a signal in a frequency band excluding at least an AC power frequency. As shown in the drawing, a low pass filter is used as filter 6160, for example. Thereby, a communication signal exchanged between PLC circuit 6130 of video device 6100 and PLC circuit 6240 of television set 6200 is blocked by filter 6160 toward power line 900.

In the sixth embodiment as described above, connecting plug 6250 of television set 6200 to electrical outlet 107 of video device 6100 allows easy setting for power line communication. Further, filter 6160 prevents the power line communication signal from flowing to plug 6110, and thus can provide video device 6100 capable of performing high-volume communication with television set 6200 without affecting the power line communication network on power line 900 connected via plug 6110.

Seventh Embodiment

Figure 24:
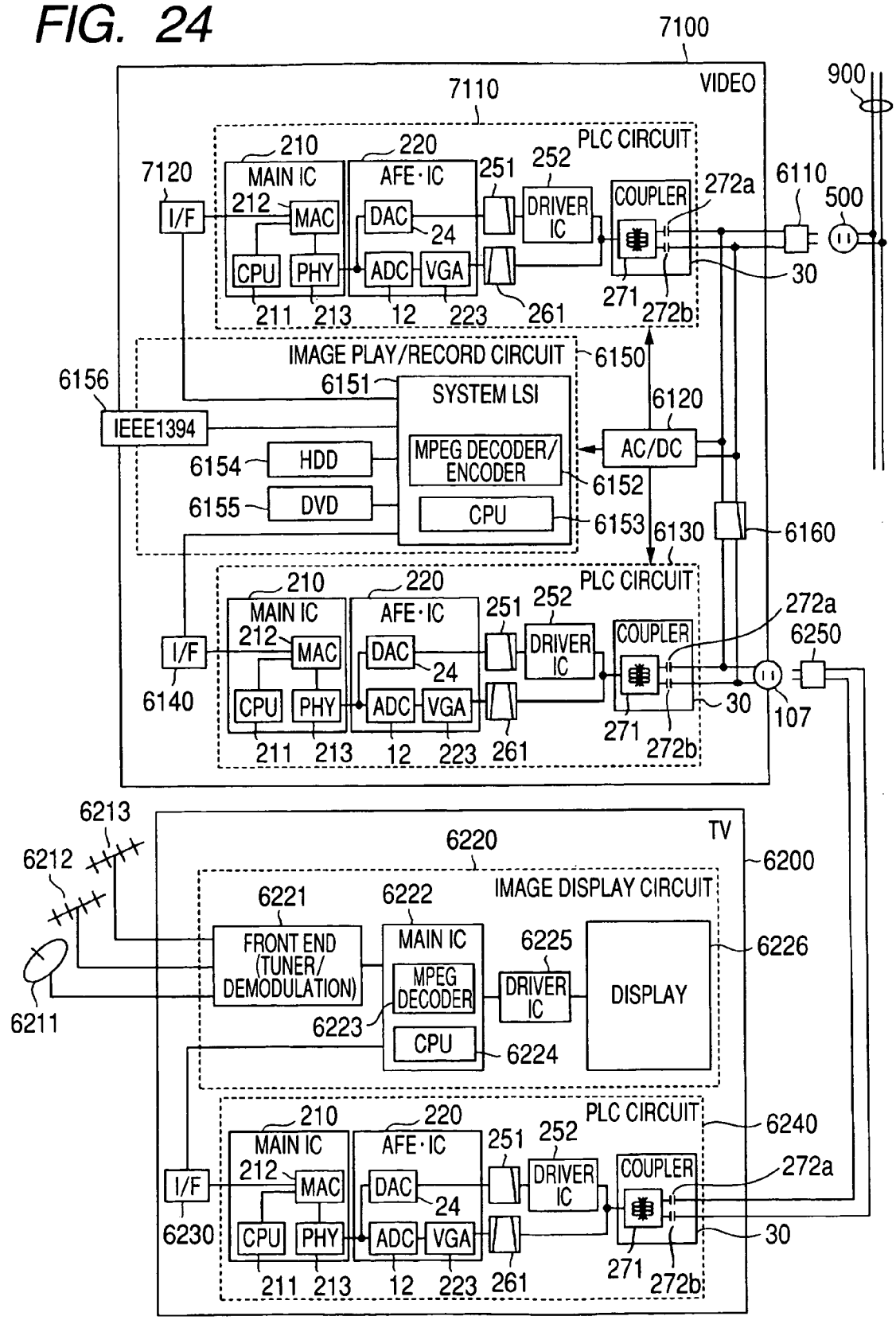
FIG. 24 is a block diagram illustrating a main configuration of a power line communication system according to a seventh embodiment.

In FIG. 24, components identical to those in FIG. 23 explained in the sixth embodiment are provided with identical reference numbers. As shown in FIG. 24, television set 6220 is identical to the sixth embodiment. Compared to video device 6100, video device 7100 further includes PLC circuit 7110 that operates as an example of a second power line communicator. Namely, video device 7100 has PLC circuit 7110 for external communication and PLC circuit 6130 exclusively for the television set.

PLC circuit 7110, which has a configuration similar to PLC circuit 6130, is connected between a path that connects plug 6110 and filter 6160, and image play/record circuit 6150. Coupler 30 of PLC circuit 7110 is connected to power connector 6110. PLC MAC block 212 of main IC 210 is connected to system LSI 6151 of image play/record circuit 6150 via interface (I/F) 7120. AC/DC conversion circuit 6120 inputs power to PLC circuit 7110.

A power line communication signal transmitted and received between PLC circuit 6130 and television set 6200 is blocked by filter 6160, and thus does not flow to PLC circuit 7110 or plug 6110. Further, a power line communication signal transmitted to and received from a communication apparatus connected from PLC circuit 7110 via plug 6110, outlet 500, and power line 900 is blocked by filter 6160, and thus does not flow to PLC circuit 6130 or television set 6220 via electrical outlet 107.

The seventh embodiment as described above can provide video device 7110 capable of performing power line communication connected to power line 900 via plug 6110, separately from communication with television set 6220.

The above-described first through seventh embodiments provide explanations using the communication apparatus that uses the power line as the transmission line and that performs wideband communication (2 to 30 MHz) in the multi-carrier communication system as an example of a communication apparatus. However, the communication apparatus according to the embodiments does not need to employ the multi-carrier communication system, but may employ a single-carrier communication system or a spread spectrum system. Further, the transmission line is not limited to the power line, but may be a transmission line used for other ordinary communication, provided that setting with an external communication apparatus via a electrical outlet can be performed on power line communication. Such transmission line includes a coaxial cable, a telephone line, a speaker line, a harness, and the like.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

This application is based on the Japanese Patent Application No. 2005-268108 filed on Sep. 15, 2005 and the Japanese Patent Application No. 2006-172549 filed on Jun. 22, 2006, entire content of which is expressly incorporated by reference herein.

What is claimed is:

1. A communication apparatus communicating with another communication apparatus, the communication apparatus comprising:
   an electrical inlet for obtaining power;
   an electrical outlet for outputting the power; and
   an integrated circuit for performing negotiation between the communication apparatus and said another communication apparatus and for determining whether a signal for the negotiation is transmitted from the electrical inlet or the electrical outlet, based on detection of a characteristic of the signal,
   wherein when the electrical outlet is connected to said another communication apparatus, the electrical outlet outputs the power to said another communication apparatus and the integrated circuit performs the negotiation with said another communication apparatus via the electrical outlet in a case that the integrated circuit determines that the signal is transmitted via the electrical outlet.

2. The communication apparatus according to claim 1, wherein the electrical inlet includes a plug and the power is AC power.

3. The communication apparatus according to claim 2, further comprising:
   a filter for electrically connecting the electrical inlet and the electrical outlet,
   wherein the electrical inlet further obtains a signal being superimposed on the AC power, and the filter attenuates the signal in a frequency band excluding at least frequency of the AC power.

4. The communication apparatus according to claim 2, further comprising:
   an auto gain controller for controlling gain of the signal, the signal being superimposed on the AC power,
   wherein the integrated circuit performs the negotiation when the gain is below a predetermined value.

5. The communication apparatus according to claim 2, further comprising:
   an auto gain controller for controlling a gain of the signal, the signal being superimposed on the AC power,
   wherein the integrated circuit performs the negotiation when the gain is above a predetermined value.

6. The communication apparatus according to claim 2, further comprising:
   an instruction input unit for receiving an instruction to permit start of the negotiation;
   a filter for attenuating a signal in a frequency band excluding at least frequency of the AC power, the signal being superimposed on the AC power; and
   a path selector for selecting one of a first path and a second path and for connecting the electrical inlet and the electrical outlet, the first path connecting via the filter, the second path connecting not via the filter, wherein the path selector selects the first path when the instruction input unit inputs an instruction to permit start of the negotiation.

7. The communication apparatus according to claim 2, wherein the integrated circuit performs the negotiation that allows a communication apparatus connected via the electrical inlet to communicate with a communication apparatus connected to the electrical outlet.

8. The communication apparatus according to claim 1, further comprising:
a connection detector for detecting connection between the electrical outlet and said another communication apparatus,
wherein the integrated circuit performs the negotiation when the connection detector detects the connection.

9. The communication apparatus according to claim 8, wherein the connection detector monitors a voltage drop at the electrical outlet, and detects the connection based on the voltage drop.

10. The communication apparatus according to claim 8, wherein the electrical outlet includes a button that is pressed down by the connection, and the connection detector detects the connection when pressing the button.

11. The communication apparatus according to claim 8, further comprising:
a display for indicating start of the negotiation when the connection detector detects a setting signal within a predetermined time after connecting between the electrical outlet and said another communication apparatus.

12. The communication apparatus according to claim 8, wherein the integrated circuit determines that the communication apparatus is one of a master device and a terminal device, based on a detection result of the connection detector.

13. The communication apparatus according to claim 12, wherein the integrated circuit sets the communication apparatus as the master device when the connection detector detects the connection.

14. The communication apparatus according to claim 12, further comprising:
a setting display for displaying a setting of the communication apparatus as one of the master device and the terminal device.

15. The communication apparatus according to claim 1, wherein the integrated circuit starts the negotiation when receiving a request for the negotiation from a communication apparatus connected to the electrical outlet.

16. The communication apparatus according to claim 1, wherein the integrated circuit performs the negotiation using a first key different from a second key, the second key being used for communication between a master device and a terminal device.

17. A communication system, comprising:
a first communication apparatus that has a first electrical inlet for obtaining power, a first electrical outlet for outputting the power, and a first integrated circuit for performing negotiation; and
a second communication apparatus that has a second electrical inlet for obtaining the power, and a second integrated circuit for performing the negotiation,
wherein when the first electrical outlet is connected to the second electrical inlet, the first electrical outlet outputs the power to the second electrical inlet and the first integrated circuit and the second integrated circuit perform the negotiation between the first communication apparatus and the second communication apparatus via the first electrical outlet and the second electrical inlet,
wherein the second integrated circuit decreases transmitting output strength during the negotiation.

18. An image capture apparatus communicating with another communication apparatus, the image capture apparatus comprising:
an electrical inlet for obtaining AC power;
an electrical outlet for outputting the AC power;
an integrated circuit for performing negotiation between the image capture apparatus and said another communication apparatus;
an image capture unit for capturing image data via the integrated circuit, the image data being output from an image output apparatus connected via the electrical outlet; and
a filter for connecting a path connecting a power outlet and the integrated circuit and the electrical inlet, and for attenuating a signal in a frequency band excluding at least a frequency of the AC power,
wherein when the electrical outlet is connected to said another communication apparatus, the electrical outlet outputs the AC power to said another communication apparatus and the integrated circuit performs the negotiation with said another communication apparatus via the electrical outlet.

19. The image capture apparatus according to claim 18, wherein a video capture apparatus further includes a second integrated circuit for being connected between a path connecting the electrical inlet and the filter and the image capture unit, and for performing power line communication.

20. A method for performing negotiation between a communication apparatus and another communication apparatus, the communication apparatus having an electrical inlet and an electrical outlet, the method comprising:
inputting power to the electrical inlet;
outputting the power from the electrical outlet; and
performing the negotiation between the communication apparatus and the another communication apparatus and determining whether a signal for the negotiation is transmitted from the electrical inlet or the electrical outlet, based on detection of a characteristic of the signal,
wherein when the electrical outlet is connected to said another communication apparatus, the power is output to said another communication apparatus and the negotiation is performed via the electrical outlet in a case that determines that the signal is transmitted via the electrical outlet.

* * * * *